(12) United States Patent
Holzwanger et al.

(10) Patent No.: US 10,598,409 B2
(45) Date of Patent: Mar. 24, 2020

(54) PORTABLE INSTANT COOLING SYSTEM WITH CONTROLLED TEMPERATURE OBTAINED THROUGH TIMED-RELEASE LIQUID OR GASEOUS $CO_2$ COOLANT FOR GENERAL REFRIGERATION USE IN MOBILE AND STATIONARY CONTAINERS

(71) Applicants: Mark Holzwanger, Hewlett, NY (US); Xianghong Henry Liu, Ann Arbor, MI (US); Heng Hu, Plymouth, MN (US); Harry Holzwanger, Bayside, NY (US); Maria Grazia Verardi, Briarcliff Manor, NY (US); Robert A. Sailer, West Fargo, ND (US); Justin Hoey, Fargo, ND (US); William John Refling, Fargo, ND (US)

(72) Inventors: Mark Holzwanger, Hewlett, NY (US); Xianghong Henry Liu, Ann Arbor, MI (US); Heng Hu, Plymouth, MN (US); Harry Holzwanger, Bayside, NY (US); Maria Grazia Verardi, Briarcliff Manor, NY (US); Robert A. Sailer, West Fargo, ND (US); Justin Hoey, Fargo, ND (US); William John Refling, Fargo, ND (US)

(73) Assignees: Frostime LLC, New York, NY (US); NDSU Research Foundation, Fargo, ND (US)

( * ) Notice: Subject to any disclaimer, the term of this patent is extended or adjusted under 35 U.S.C. 154(b) by 0 days.

(21) Appl. No.: 15/985,592

(22) Filed: May 21, 2018

(65) Prior Publication Data
US 2018/0274824 A1    Sep. 27, 2018

Related U.S. Application Data

(63) Continuation-in-part of application No. 15/382,716, filed on Dec. 18, 2016, now Pat. No. 9,976,782.

(51) Int. Cl.
*F25B 9/02* (2006.01)
*F25B 19/00* (2006.01)
(Continued)

(52) U.S. Cl.
CPC ............... *F25B 9/02* (2013.01); *F17C 9/04* (2013.01); *F25B 19/005* (2013.01); *F25D 3/12* (2013.01);
(Continued)

(58) Field of Classification Search
CPC .. F25B 19/005; F25B 9/008; F25B 2339/024; F25B 9/02; F25B 2600/2513;
(Continued)

(56) References Cited

U.S. PATENT DOCUMENTS 2,883,835 A * 4/1959 Pikey .................. F25B 1/00
                                                62/116
3,257,820 A * 6/1966 Case .................. F25D 3/105
                                                27/11
(Continued)

*Primary Examiner* — Nelson J Nieves
(74) *Attorney, Agent, or Firm* — Thomas I. Rozsa

(57) ABSTRACT

Standalone and self-contained cooling systems using compressed liquid and/or gas $CO_2$ containers positioned in an insulated or non-insulated vessel encompassing a container which is either vertically positioned in an upright or an upside-down position.

The liquid and/or gas $CO_2$ coolant is then released into a capillary system or flow metering system to allow the $CO_2$ to enter a second body to where the $CO_2$ coolant properties may be leveraged. The second body includes, by way of example, a plate, a cushion, a spot treatment pad for a person's muscle, or a cooler.

The temperature is controlled by a metering $CO_2$ releasing system encompassing an electronic control device which sends alerts when pre-defined thresholds are exceeded.

(Continued)

The invention's metering $CO_2$ releasing system may be triggered by an electronic or a thermostatic valve or may be triggered manually or by an electronic solenoid.

5 Claims, 47 Drawing Sheets

(51) Int. Cl.
*F25D 3/12* (2006.01)
*F17C 9/04* (2006.01)
*F25D 29/00* (2006.01)
*G05D 23/19* (2006.01)

(52) U.S. Cl.
CPC .......... *F25D 29/001* (2013.01); *G05D 23/19* (2013.01); *F25B 2600/2513* (2013.01); *F25B 2600/2525* (2013.01)

(58) Field of Classification Search
CPC ......... F25B 2600/2525; A41D 13/0056; F25D 7/00; B60H 1/00364; B60H 1/00014
See application file for complete search history.

(56) References Cited

U.S. PATENT DOCUMENTS

| | | | | |
|---|---|---|---|---|
| 3,410,109 A * | 11/1968 | Maryland | ............... | F25D 3/107 62/457.9 |
| 3,423,953 A * | 1/1969 | Spiller | ............... | F25B 19/00 62/217 |
| 3,633,381 A * | 1/1972 | Haaf | ............... | F25D 3/107 62/222 |
| 3,800,552 A * | 4/1974 | Sollami | ............... | A61B 18/02 606/23 |
| 3,820,352 A * | 6/1974 | Mahler | ............... | F25D 3/10 165/168 |
| 3,848,429 A * | 11/1974 | Franklin, Jr. | ............... | F25D 3/00 62/426 |
| 3,959,982 A * | 6/1976 | Denis | ............... | F25B 19/00 62/223 |
| 4,054,037 A * | 10/1977 | Yoder | ............... | F25D 3/107 62/224 |
| 4,096,707 A | 6/1978 | Taylor | | |
| 4,195,491 A * | 4/1980 | Roncaglione | ............... | F25D 3/14 137/67 |
| 4,404,818 A | 9/1983 | Franklin, Jr. | | |
| 4,406,131 A * | 9/1983 | Weasel, Jr. | ............... | F25D 3/105 426/524 |
| 4,407,144 A * | 10/1983 | Garside | ............... | F17C 3/10 62/239 |
| 4,580,411 A * | 4/1986 | Orfitelli | ............... | F25D 3/107 62/371 |
| 4,825,666 A * | 5/1989 | Saia, III | ............... | B60H 1/3226 62/384 |
| 4,846,257 A * | 7/1989 | Wallace | ............... | A45C 11/20 165/253 |
| 5,111,668 A * | 5/1992 | Parrish | ............... | F25B 17/08 62/259.3 |
| 5,125,237 A * | 6/1992 | Saia, III | ............... | B60H 1/3226 62/239 |
| 5,201,365 A * | 4/1993 | Siegel | ............... | A41D 13/0056 165/104.21 |
| 5,263,336 A * | 11/1993 | Kuramarohit | ...... | A41D 13/0056 165/46 |
| 5,715,685 A * | 2/1998 | Takasugi | ............... | F25D 3/105 62/239 |
| 6,003,322 A * | 12/1999 | Graham | ............... | F25D 3/105 62/52.1 |
| 6,345,509 B1 * | 2/2002 | Garlov | ............... | A23L 3/36 62/62 |
| 6,354,099 B1 * | 3/2002 | Bieberich | ............ | A61F 7/0097 607/104 |
| 6,615,914 B1 * | 9/2003 | Young | ............... | B01B 1/005 165/263 |
| 6,925,834 B2 | 8/2005 | Fuchs | | |
| 7,386,995 B2 | 6/2008 | Gomes et al. | | |
| 2002/0129613 A1 * | 9/2002 | Viegas | ............... | B60H 1/00014 62/239 |
| 2003/0029179 A1 * | 2/2003 | Vander Woude | .. | B60H 1/00014 62/201 |
| 2003/0172660 A1 * | 9/2003 | Odawara | ............... | F25B 19/005 62/49.2 |
| 2006/0016189 A1 * | 1/2006 | Johnson | ............... | F23K 5/08 60/651 |
| 2008/0053125 A1 * | 3/2008 | Satake | ............... | F25B 41/062 62/222 |
| 2010/0011489 A1 * | 1/2010 | Goldmann | ........... | A41D 13/002 2/455 |
| 2010/0011491 A1 * | 1/2010 | Goldmann | ........... | A41D 13/002 2/458 |
| 2012/0138848 A1 | 6/2012 | Leavitt et al. | | |
| 2012/0174600 A1 * | 7/2012 | Bowdish | ............... | F25B 9/00 62/49.1 |
| 2013/0166079 A1 * | 6/2013 | Wilhelm | ............... | F25D 31/00 700/282 |
| 2013/0340444 A1 * | 12/2013 | Bryant | ............... | B60H 1/00964 62/62 |
| 2014/0216070 A1 * | 8/2014 | Owens | ............... | F25D 3/10 62/64 |
| 2015/0144296 A1 * | 5/2015 | Macron | ............... | B60P 3/20 165/11.1 |
| 2015/0246593 A1 * | 9/2015 | Larson | ............... | B60H 1/00014 62/56 |
| 2017/0292759 A1 * | 10/2017 | Al-Hallaj | ........... | B60H 1/00014 |

\* cited by examiner

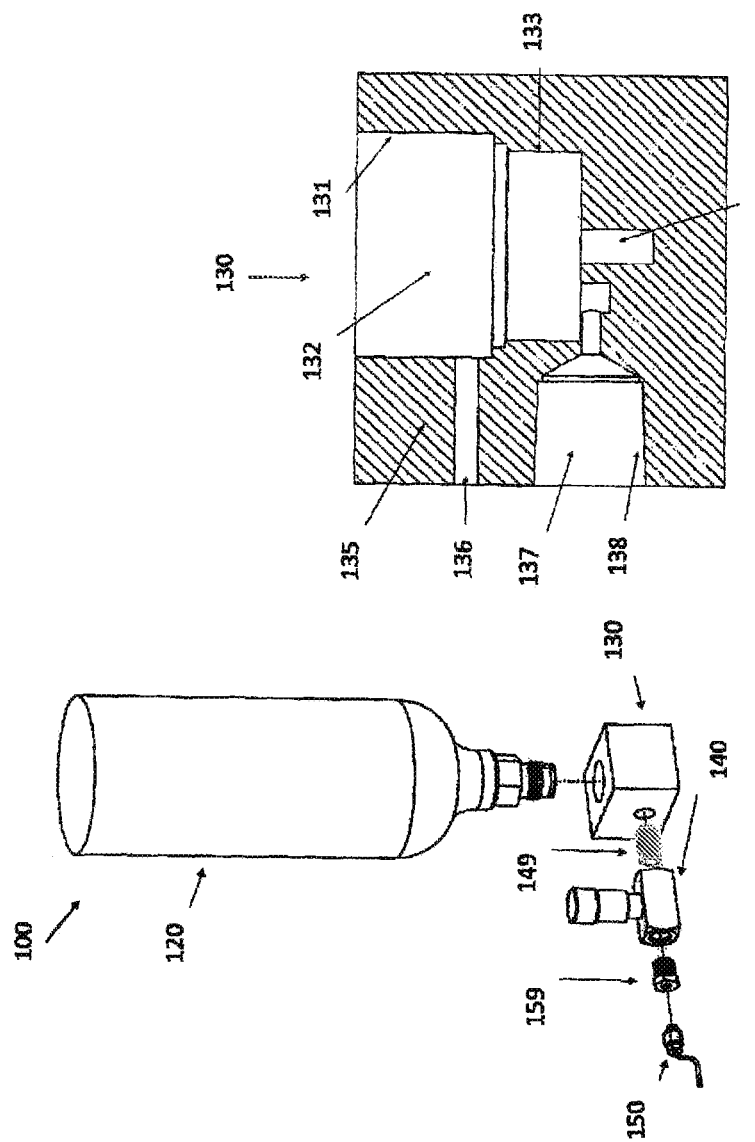

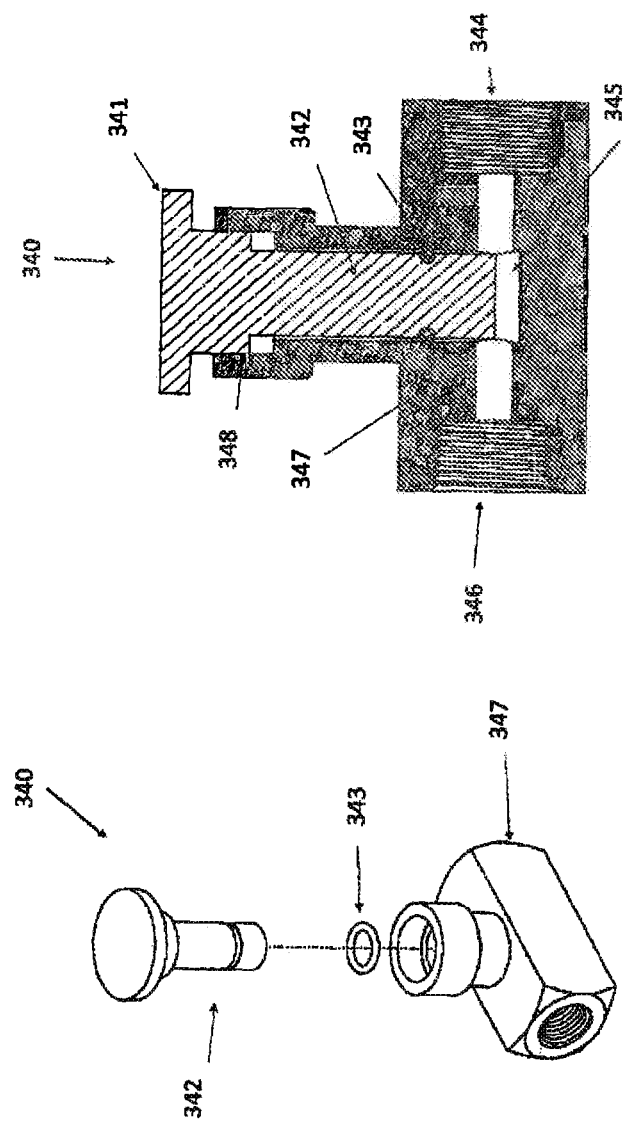

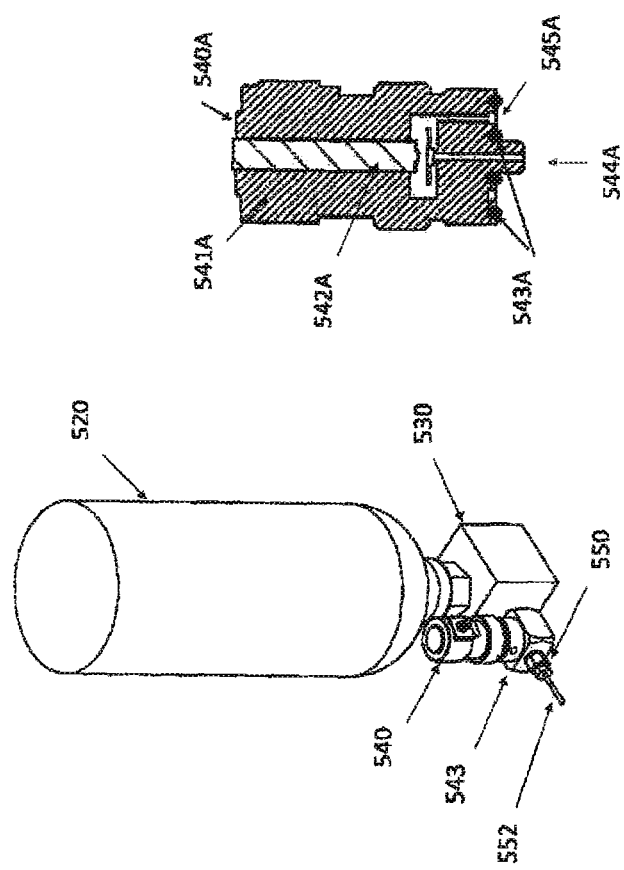

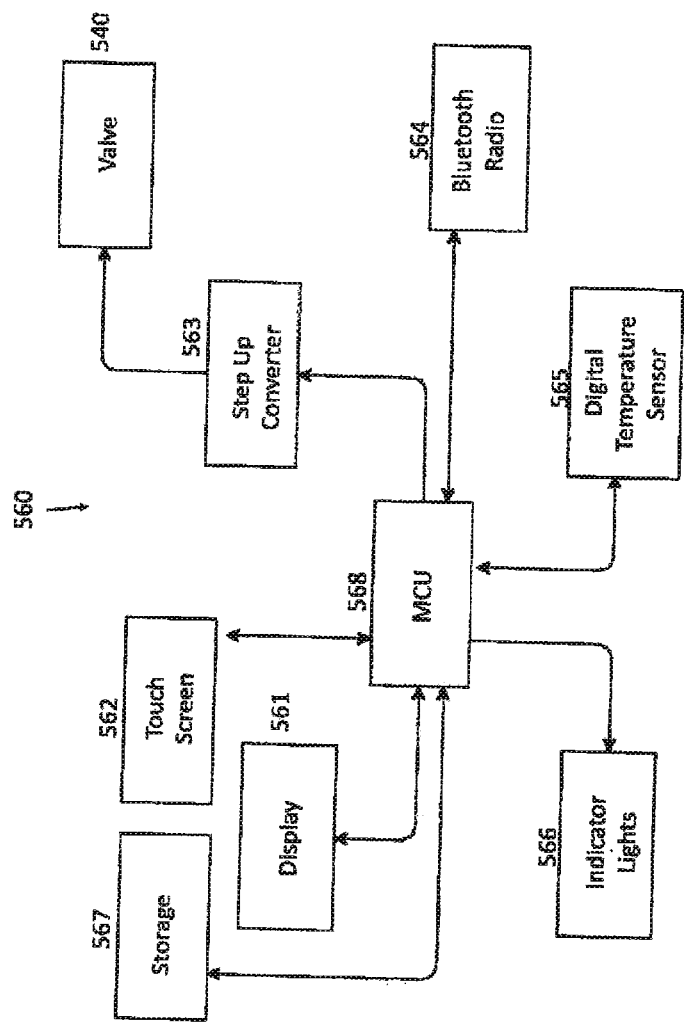

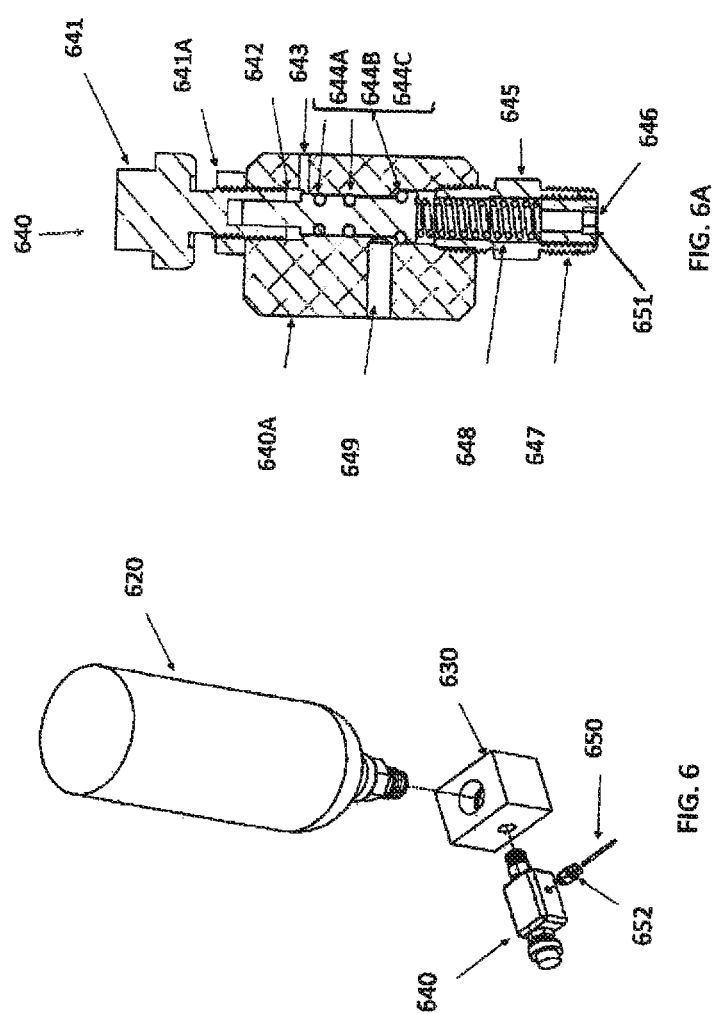

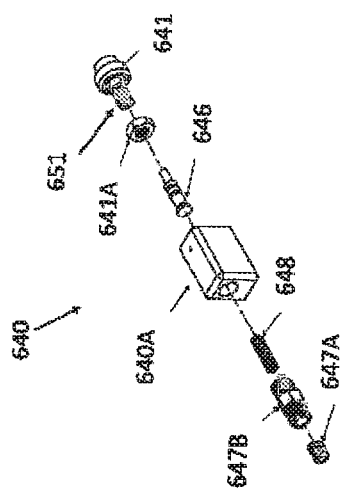

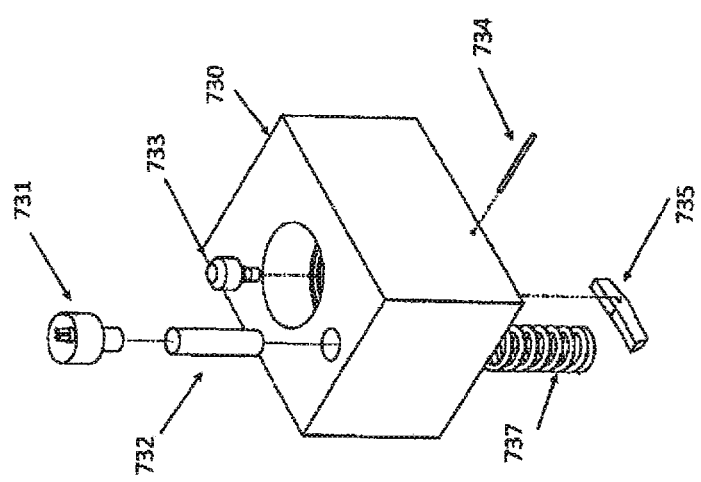
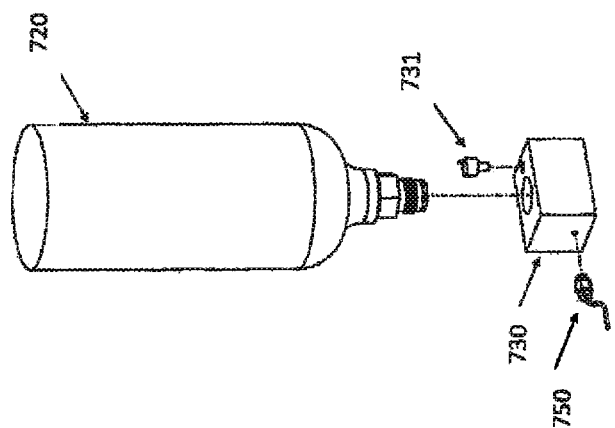

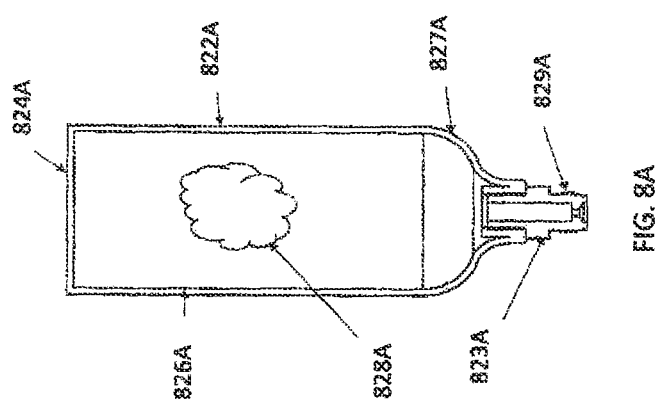

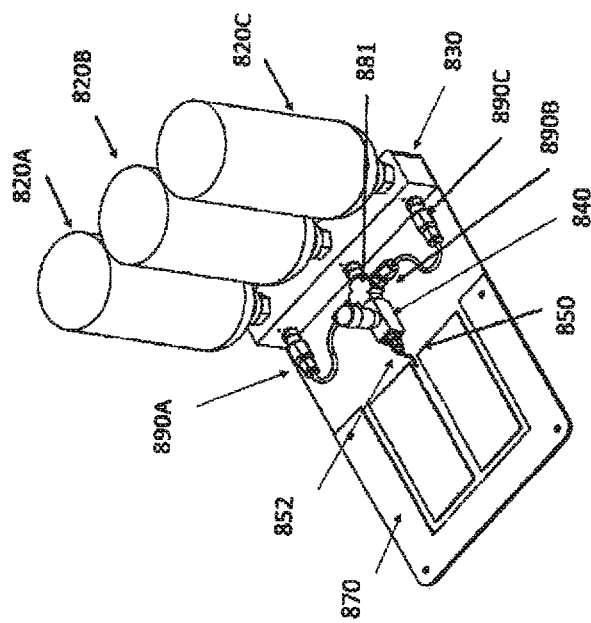

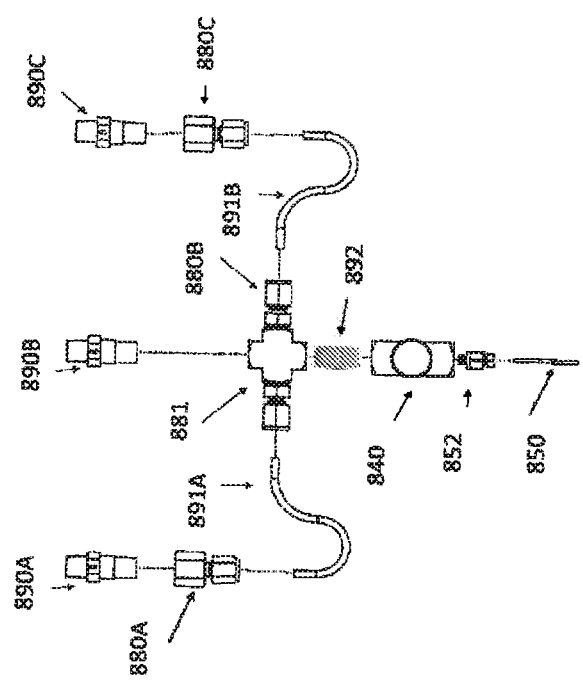

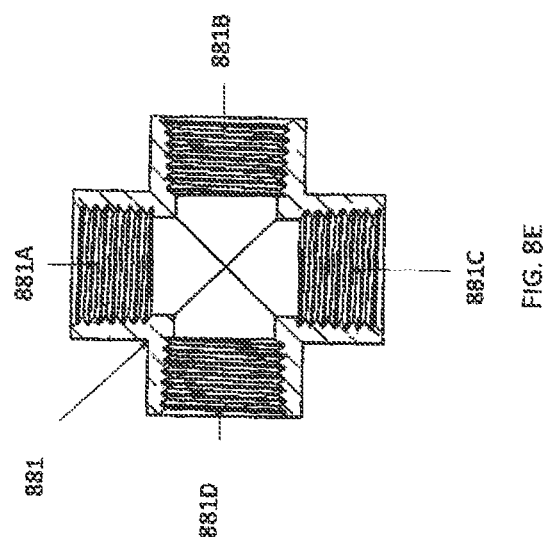

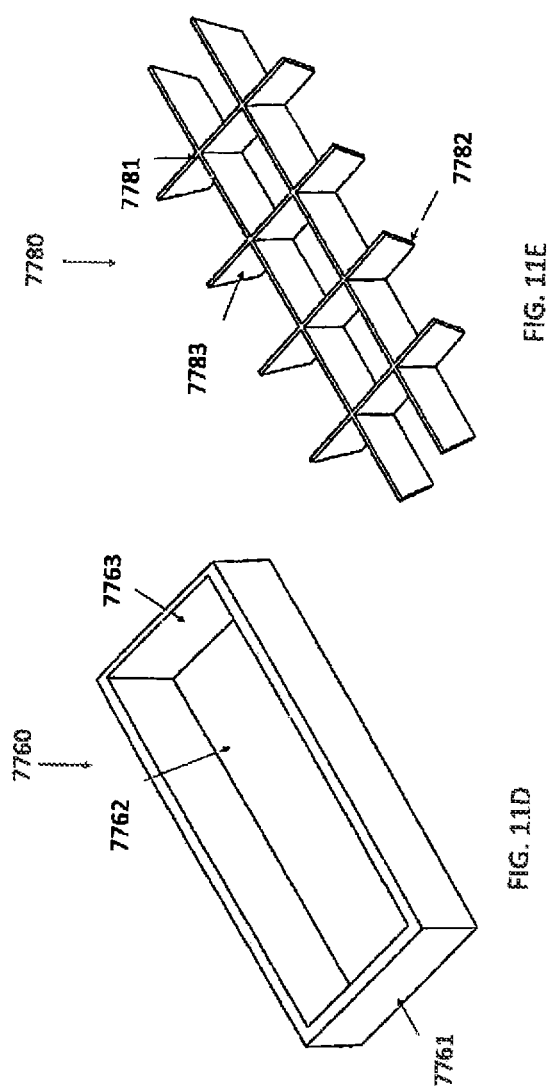

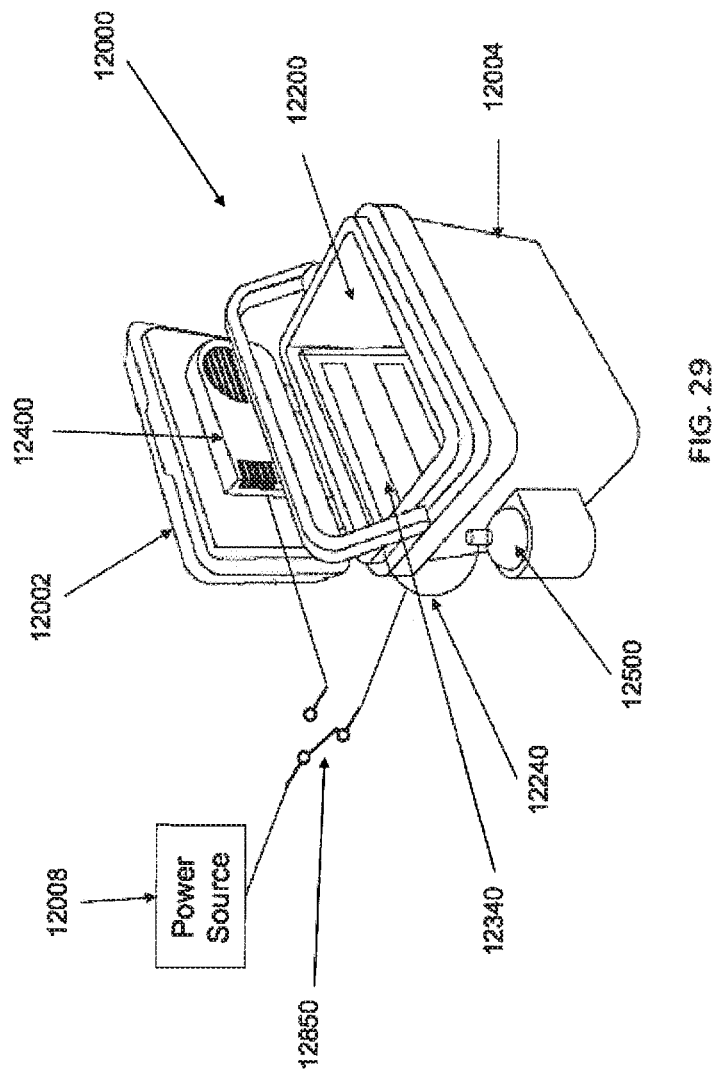

PORTABLE INSTANT COOLING SYSTEM WITH CONTROLLED TEMPERATURE OBTAINED THROUGH TIMED-RELEASE LIQUID OR GASEOUS $CO_2$ COOLANT FOR GENERAL REFRIGERATION USE IN MOBILE AND STATIONARY CONTAINERS

CROSS-REFERENCE TO RELATED APPLICATION

This patent application is a continuation-in-part of application Ser. No. 15/382,716 filed on Dec. 18, 2016, now pending.

BACKGROUND OF THE INVENTION

1. Field of the Invention

This invention relates to the field of providing cooling temperatures to portable units such as insulated or non-insulated ice chests or coolers. These various items are intended for portable use where the product will be taken by individuals to locations which do not have electricity connections and which do not have conventional methods for refrigerating items such as food, beverages, medical supplies, blood, organs, temperature sensitive chemicals and pharmaceuticals, any prev resulting from fishing or hunting activities or any other perishable items in need of refrigeration, cooling or freezing for a desired period of time.

2. Description of the Prior Art

Methods for cooling items with no ices or available electricity have been known in the prior art but the apparatus and method to maintain controlled temperatures utilizing liquid and/or gaseous $CO_2$ as a refrigerant has not been found in any prior art. Therefore, there is a significant need for an improved apparatus and method to keep objects in a cool or even frozen condition depending upon the object and its requirement for its temperature control and the length of time it must be in the cooler or frozen condition.

The following prior art is the closest prior art which the present inventors have located and is the closest prior art to the best of the present inventors' knowledge related to the present inventors' invention.

1. U.S. Pat. No. 4,096,707 for "PORTABLE REFRIGERATION MACHINE" issued on Jun. 27, 1978 to Taylor.

The patent discloses a portable refrigeration machine that includes a vertically oriented pressure vessel containing carbon dioxide in gaseous, liquid and/or solid states. A heat exchanger is secured to the lower external portion of the vessel and an outer housing surrounds the vessel to leave an annulus between the exterior wall of the vessel and the interior wall of the housing. A gas pressure operated fan is disposed beneath the heat exchanger and connected for operation by gas pressure from the vessel to rotate. The fan draws in air through appropriate lower inlet openings which air passes through the heat exchanger and annulus out outlet opening to thereby cool and circulate the air in a compartment within which the portable refrigeration machine is placed. This device utilizes a gas pressure operated fan to maintain temperature and dispose heat to provide room for cool air.

This patent discloses fan-technology for use as a coolant and this is completely different from the present invention.

2. U.S. Pat. No. 4,195,491 for "DRY ICE REFRIGERATOR" issued on Apr. 1, 1980 to Roncaglione.

The patent discloses an apparatus for converting a conventional insulating picnic cooler or the like into a refrigerator and includes a small container, disposable within the cooler, for dry ice. A rectangular frame insertable within the interior of the cooler includes a pair of refrigeration coils, which are disposed in proximity to opposed side walls of the cooler. One end of each of the coils connects to the dry ice container. The other end of the coils connects to a manually adjustable valve having a pressed blowout section for relieving excess pressure. The valve is disposed in the exterior of the container. Gas flowing through the valve from the coil passes to the atmosphere through an indicator having a body of fluid in a transparent window so that bubbles produced upon passage of the gas are visible and allow manual adjustment of the valve to control the rate of gas flow and thus the rate of sublimation of the dry ice and the temperature within the cooler.

This device utilizes a valve controlled release in order to perform functions of maintaining temperature but has many deficiencies including the inability to monitor and maintain a specific temperature and no ability to be handled remotely. Therefore, the disclosure in this patent is different from the present invention.

3. U.S. Pat. No. 4,404,818 for "$CO_2$ SNOW COOLER WITH SNOW SPLITTING BOTTOM" issued on Sep. 20, 1989 to Franklin, Jr.

The patent discloses a vertically elongated hollow housing including opposite generally parallel side and end walls is provided and closed at its top by a top wall. $CO_2$ snow forming structure is disposed in an upper portion of the interior of the housing and a bottom wall structure closes the lower portion of the housing. The bottom wall structure includes an elongated horizontally disposed inverted V-shaped wedge of sharply tapered configuration extending between the end walls of the housing and the wedge is functional to split the lower portion of a quantity of snow disposed within the housing above the wedge and to force the lower portions of the quantity of snow into full surface-to-surface heat transfer relation with the inner surfaces of the lower portions of the side walls of the housing horizontally aligned with and opposing the wedge as the quantity of snow sublimes. Further, the sidewalls of the housing include vertically extending corrugations functioning to at least substantially double the exposed inner and outer surface area of the sidewalls. The corrugations themselves are trapezoidal in cross section whereby substantially full surface to surface contact between the lower portions of a quantity of $CO_2$ snow disposed within the housing and the inner surfaces of the corrugated side walls thereof is assured.

The disclosure in this patent utilized $CO_2$ to produce snow and it is not a device designed to keep items refrigerated under a controlled temperature.

4. U.S. Pat. No. 7,386,995 for "DEVICE FOR PRODUCING DRY ICE AND PRESSURE RELIEF THEREOF" issued on Jun. 17, 2008 to Gomes et al.

The patent discloses a device for producing a solidified block of carbon dioxide and includes first and second housing portions removably connectable together. The first and second housing portions form an interior molding chamber that is adapted to receive liquid carbon dioxide at a pressure where expansion of the liquid carbon dioxide occurs, resulting in a mixture of solidified and gaseous carbon dioxide. A pressure relief device includes a biasing member for biasing the first and second housing portions together. The biasing member permits relative movement between the first and second housing portions when internal pressure from the gaseous carbon dioxide exceeds a predetermined amount. With this arrangement, relative movement between first and second housing portions causes gaseous carbon dioxide to be released from the interior molding chamber to thereby reduce the internal pressure. This device utilizes liquid $CO_2$ for the only purpose of producing dry ice, which can be used to refrigerate items, and, it is not a device designed to keep items refrigerated under a controlled temperature.

5. United States Patent 20120138848 for "COOLING AGENT FOR COLD PACKS AND FOOD AND BEVERAGE CONTAINERS" published on Jun. 7, 2012 to Leavitt et al.

The patent discloses a safe, stable, non-toxic and recyclable cooling compositions comprising solid particulate compounds that undergo an endothermic process when mixed with water such that the resulting mixture is useful for cooling surfaces, liquids and solids. The compositions always include one or more compounds from a group consisting of endothermic compounds that contain potassium; one or more compounds from a group of endothermic compounds that contain nitrogen; and at least one compound from a group consisting of ammonium phosphate, diammonium phosphate, ammonium polyphosphate, ammonium pyrophosphate and ammonium metaphosphate such that the compound or mixture of compounds in this group is at least 1% by weight of the final composition.

This method disclosed in this patent utilizes a mixture of several compounds to cool any given surface, solid or liquid. The present invention does not require this complicated process of using several compounds which itself could lead to many errors and problems.

6. U.S. Pat. No. 6,925,834 for "PORTABLE COOLER INCLUDING ICE SHEET HAVING REFRIGERANT CUBES" issued on Sep. 13, 2003 to Fuchs.

The patent discloses a portable cooler having one or more ice sheets including built-in refrigerant cubes. The cooler comprises an outer fabric shell and one or more sets of spaced apart refrigerant cubes encapsulated in plastic to form ice sheets that are attached to the interior walls of the cooler. The walls of the cooler may also include one or more layers of thermal insulation. The ice sheets provide a visually pleasing appearance to the inside of the cooler suggestive of cooling effects. The ice sheets may be retained along the walls of the cooler by seams sewn along the lanes passing between the refrigerant cubes, by being retained in pockets formed by sidewall liners or be being secured into chambers defined by the cooler's outer walls and a plastic insert fitted into the cooler.

This device utilizes ice sheets and the need to replace them as called for, with the temperature being maintained by manner of the insulated ice sheets.

The present invention does not use ice sheets and this disclosure is totally different from the present invention.

7. "CO2ler" is a product that has been identified on the Internet. However, the inventors' research and investigation into this product did not find any related patent. This product is a cooler that has been specially made to have a closed compartment for one $CO_2$ tank. The $CO_2$ system used in the "Co2ler" utilizes one tank only and it is not a device designed to keep items refrigerated under a controlled temperature.

None of the prior art has a method of system or apparatus to prevent or stop any freezing of an item or the freezing of an area.

None of the prior art has a method of system or apparatus to prevent the forming of the dry-ice while allowing the continuous flow of the $CO_2$ thus preventing dry-ice.

None of the prior art has the ability to control or regulate the temperature of items or areas to be limited to cooling or maintaining a predetermined temperature and preventing the decrease in temperature with the prior art methods or systems to prevent freezing of items or areas intended for the reduction or refrigeration of.

The use of $CO_2$ as a refrigerant in portable refrigeration similar to the present invention has previously been limited to the use of "dry ice". Dry ice has several drawbacks including: 1) production of dry ice from liquid $CO_2$ is relatively inefficient and a significant amount of $CO_2$ is wasted during the process, 2) the temperature of dry ice is too low to be used in direct contact with many items that require refrigeration temperature, 3) dry ice must be stored in an insulated container, as it sublimates at room temperature, reducing the dry ice's effective cooling capacity over time, 4) dry ice can be a safety hazard as its inherent temperature at atmospheric pressure can cause frostbite almost instantly.

There is a significant need for an improved apparatus and method to utilize $CO_2$ as a coolant in various applications.

SUMMARY OF THE INVENTION

The present invention is a standalone and self-contained cooling system using compressed liquid and/or gas $CO_2$ containers positioned in an insulated or non-insulated vessel and consisting of a specially designed unit where the containers are vertically positioned in an upright or in an upside-down position. The liquid and/or gas $CO_2$ coolant is then released into capillary tube(s) embedded into a heat transfer plate or heat exchanger thus leveraging the $CO_2$ coolant properties.

The temperature is controlled by a metering $CO_2$ releasing system encompassing an electronic control device which can be operated remotely and/or via a touch screen and which sends alerts when pre-defined thresholds are exceeded.

The invention's metering $CO_2$ releasing system may be triggered by an electronic or a thermostatic valve or may be triggered manually or by an electronic solenoid. The invention's cooling system also encompasses check valves, which avoid liquid and/or gas $CO_2$ from escaping when removing or replacing $CO_2$ containers individually.

The present invention consists of self-contained cooling system(s) using compressed liquid and/or gas $CO_2$ as coolant to refrigerate, cool or freeze items inside a portable insulated or non-insulated vessel. The present invention is capable of providing a controlled, steady and constant flow of liquid and/or gas $CO_2$ thus maintaining the items in need to be refrigerated, cooled or frozen at the desired temperature.

The present invention relates to the field of providing a source of cooling to desired temperatures going from cool to cold to freezing depending upon the product which is desired to be kept cold within the cooler or ice chest.

This invention relates to the field of providing constant and controlled cooling temperatures to various items using refillable $CO_2$ canisters as refrigerant without the necessity of electricity and without the necessity of having to have a built-in cooling unit within the container.

The following words: a) canister, b) cylinder, c) cartridge and d) tank are used interchangeably throughout this text to indicate the $CO_2$ refillable container.

The following words: a) release valve, b) control valve and c) dispense valve are used interchangeably throughout this text to indicate the releasing member allowing the liquid and/or gas the $CO_2$ to be distributed into the invention's cooling system in a controlled manner.

It has been discovered that the present invention provides the following advantages for using liquid $CO_2$, among the advantages including 1) liquid $CO_2$ is storable at standard ambient conditions, 2) cooling capacity does not degrade with length of storage, 3) there is no residual liquid $CO_2$ after cooling capacity is exhausted, 4) temperature is continuously variable from ambient to below −40° F. allowing, for example, to maintain ice cream frozen or to keep organs at a constant temperature for transplant transportation, 5) coolant is easily replaced without the need to remove material from the container volume, 6) $CO_2$ containers and refilling of $CO_2$ containers are already commonly available (e.g. beverage and paintball industry), 7) $CO_2$ is not wet or easily spillable as it is in a pressurized container.

The invention's cooling system is comprised of a) at least one liquid and/or gas container; b) a gas or liquid retained within said at least one liquid and/or gas container; c) a retaining member having a body with at least an upper surface and a bottom surface; d) said retaining member enclosing a flow metering system; e) a manifold block; f) a check valve between the manifold block and the at least one liquid and/or gas container, the check valve connected to said flow metering system to release liquid and/or gas to said retaining member; and g) a control valve.

The invention's cooling system defined in greater detail comprises at least one liquid and/or gas container; a) a gas or liquid retained within said at least one liquid and/or gas container; b) said container valve located adjacent said at least one liquid and/or gas container and a frame; c) said frame having at least one opening; d) a container valve sized to fit into said at least one opening in a frame; e) a manifold block; f) a check valve between the manifold block and the at least one liquid and/or gas container, the check valve connected to said flow metering system to release liquid and/or gas to said retaining member; and g) a control valve; h) whereby, said frame retains said at least one liquid and or gas container to remain stable during movement.

The invention's cooling system defined in further detail comprises: a) at least one liquid and/or gas container; b) a gas or liquid retained within said at least one liquid and/or gas container; c) a retaining member having a body with at least an upper surface and a bottom surface; d) said retaining member enclosing a flow metering system; e) a manifold block; f) a check valve between the manifold block and the at least one liquid and/or gas container, the check valve connected to said flow metering system to release liquid and/or gas to said retaining member; g) a control valve; and h) said retaining member is located on at least one horizontal surface or at least one vertical surface.

The invention's hybrid cooler defined in detail comprises: A hybrid cooler comprising: a) an electronic coordination device; b) a power source connected to a body having an electric cooling system with a closeable lid, the closeable lid surrounding an interior chamber within the electric cooling system; c) a control switch that is directly connected to said power source and said electronic coordination device; d) at least one liquid and/or gas container; e) a gas or liquid retained within said at least one liquid and/or gas container; f) a retaining member to retain said at least one liquid and/or gas container to said body; g) a flow metering system; h) a manifold block; i) a check valve between the manifold block and the at least one liquid and/or gas container, the check valve connected to said flow metering system to release liquid and/or gas; and j) a control valve; k) wherein said electronic coordination device senses the source of power to run the electronic cooling system has reached a desired level and will turn off the electronic cooling system and activate and turn on the liquid or gas cooling system of the present invention.

The liquid and/or gas $CO_2$ containers are positioned in the invention vertically in an upright or upside-down position.

When the $CO_2$ container(s) is/are in an upright position, the invention's control valve has a siphon tube of a suitable length to be able to reach the bottom of the $CO_2$ container. The siphon tube allows the liquid $CO_2$ to flow from the bottom to the top of $CO_2$ container and then to exit through the invention's control or release valve.

When the $CO_2$ container(s) is/are in an upside-down position, because of the gravity force, the liquid or gaseous $CO_2$ flows from the $CO_2$ container and exits through the invention's control or release valve.

It is also an object of the present invention to provide a special designed manifold block where the $CO_2$ container(s) are placed on, and which allows the passage of the refrigerant from the $CO_2$ container(s) into the invention's cooling system.

It is an object of the present invention to provide a cooling system containing a heat transfer plate (also referred to as heat exchanger) and liquid and/or gas $CO_2$ distribution through capillary tubes embedded in the said heat exchanger to maximize energy transfer from the liquid and/or gas $CO_2$ to the contents of a vessel which may or may not be insulated, thereby keeping the vessels' contents at a desired temperature.

It is additionally an object of the present invention to provide capillary tube(s) to convey the liquid and/or gas $CO_2$ along the heat transfer plate of the invention's cooling systems. The capillary tube(s) allows the flow of the liquid and/or gas $CO_2$ being released for the purpose of maintaining or reducing the temperature of the containers being cooled by the cooling systems.

It is a further object of the present invention to provide a metering $CO_2$ control releasing system for the $CO_2$ release which enables the controlled release of the liquid and/or gas $CO_2$ inside the invention's cooling systems.

It is a further object of the present invention to provide release valve (also referred to as control valves), as part of the metering $CO_2$ control releasing system, which can be controlled or actuated manually, electromechanically, electronically or thermostatically, to release the liquid and/or $CO_2$ from the $CO_2$ containers into the invention's cooling systems. The invention's control valves are specifically designed to prevent the freezing and clogging and blocking of the capillary(s) tubing by calibrating the control valves to flow the optimal amount of liquid and/or gas $CO_2$. Without the inventions control valves in the invention's cooling systems, the invention's capillary tubes could be clogged or blocked or frozen not allowing the liquid and/or gas $CO_2$ to be properly released. The invention's designed cooling systems are capable of providing a steady and constant flow of liquid and/or gas $CO_2$ to insulated or non-insulated portable units (i.e.: ice chests, coolers, lunch boxes), stationary units (i.e.: refrigerators, freezers), compartments of vehicles (i.e.: trunk or cabinet located in a car or autonomous vehicles), aircrafts, small unmanned aerial vehicles (drone), motorcycles, scooters or bicycles.

It is also an object of the present invention to provide a cooling system with multi-$CO_2$ containers with configuration that comprises check valves. The check valves are used between the container manifold block and the connections joining the $CO_2$ containers. This eliminates liquid and/or gas $CO_2$ from escaping when removing or replacing tanks individually. The compressed $CO_2$ containers are positioned in the invention's specifically designed cooling systems in a vertical upright or upside-down position in order to maintain the $CO_2$ liquid and gas balance within the $CO_2$ container when the liquid/and or gas is expelled from said container.

It has been discovered according to the present invention that when the $CO_2$ container(s) is(are) in an upright position, the invention's control valve has a siphon tube of a suitable length able to reach the bottom of the $CO_2$ container. The siphon tube allows the liquid $CO_2$ to flow from the bottom to the top of $CO_2$ container and then to exit through the invention's control valve.

It has further been discovered according to the present invention that when the $CO_2$ container(s) is(are) in an upside-down position, the liquid goes down because of gravity force and the liquid $CO_2$ flows from the bottom to the top of $CO_2$ container and then exits through the inventions' control valve.

It is an additional object of the present invention to provide a metering $CO_2$ control releasing system which is monitored, controlled and operated electronically using a touch screen or, remotely, using a smartphone application or any other electronic devices. The invention's metering $CO_2$ control releasing system has different configurations according to the type of release valve and to the number of $CO_2$ container(s).

It is also an important object of the present invention to provide cooling systems that also includes an electronic control device powered by battery, solar panel or +12V socket in the car, which allows to monitor and control temperatures, control algorithms, and a metering $CO_2$ control releasing system. These components are attached to, or enclosed in, or can be placed in any kind and any size insulated or non-insulated vessels to minimize heat transfer with the environment.

It is also an object of the present invention to provide a system which contains an electronic control strategy using encrypted data to avoid spoofing, intrusion, interference, meaconing, jamming or data falsification. To encrypt the transmitted data a message authentication code (MAC) method will be used. Because an active control (electronic) is the most accurate, flexible, and easy to operate, it is envisioned that this is the preferred embodiment. Data is transmitted from the active controllers of the inventions' cooling systems via WiFi, Bluetooth and Radio Frequencies to a smartphone or tablet or a server or any kind of other device will be encrypted to avoid spoofing, intrusion, interference, meaconing, jamming or falsifying data.

It is additionally an object of the present invention to provide a cooling system which can be transported, stored and moved to locations which do not have electricity connections, where electrical service has been disrupted (e.g. utility power outage) or which do not have conventional methods for refrigerating, cooling or freezing.

The invention of the cooling systems was envisioned by the inventors working together on delivering the optimum cooling system which results in cooling temperatures utilizing liquid and/or gas $CO_2$ to insulated and not-insulated vessels, containers, compartments, enclosed areas, cooling systems claimed in this invention utilizing any type and size of $CO_2$ containers positioned on, in or near an area where there is a need or desire to reduce or to maintain a specified or required temperature.

Many additional features, apparatus and methods of the present invention are described in the following paragraphs.

The design is specific for the use of coolers and can be also designed for any type of system that is in need of refrigeration. The invention is not required to have any specially made cooler as it is a standalone and can be designed specific.

The present invention includes a specially designed insulated cooler which embeds the invention's cooling system and the electronic control device to monitor and control the temperature.

The present invention includes an additional accessory that can be placed into the cooler to produce ice on a specially designed ice making system in a period of time from 1 to 10 minutes. The mechanism to convey the liquid and/or gas $CO_2$ into the specially designed ice making system may be directly connected to the capillary assembly. The specially designed ice making accessory includes: a) a connection assembly to the principal unit of this invention, b) an ice tray block which is attached to a bottom cold disbursement plate with fasteners, c) a containment tray which holds the water or other liquids where the cold is dispersed into; d) a divider which will be full of water or other liquids. The plate assembly is fastened together by ice tray bottom plate fasteners.

The present invention includes a cooling system for individual beverage containers such as cans/bottles or individual containers, which needs to be cooled or to be maintained at a cooled temperature or frozen. This invention's cooling system has a circular designed casing which, except for the top of the cooling unit, is enclosed allowing for a beverage container to be placed into it. The cooling unit has the invention's control system utilizing the manual, electromechanical, electronic or thermostatic valve depending and according to the type of beverage(s) intended or desired to be cooled.

The present invention also includes a portable cooling system equipped with wheels to be easily transported and which can be easily connected to a refrigerator through a suitable connector designed in collaboration to the refrigerators' makers or a capillary passing through the refrigerator's door gasket in order to deliver $CO_2$ as a coolant to the refrigerator when a power supply outage occurs. The $CO_2$ canister is in the upright position with a siphon tube of a suitable length able to reach the bottom of the $CO_2$ container. The siphon tube allows the liquid $CO_2$ to flow from the bottom to the top of $CO_2$ container and then to exit through the invention's control or release valve. This invention's cooling system is envisioned to be specifically designed to be connected and attached to the refrigerator system to minimize or eliminate the amount of heat transfer from the refrigerator to the external environment.

The present invention additionally includes a system designed to transport goods, which need controlled refrigeration such as medical, pharmaceutical, foods and any other small cooled or frozen items using a Small Unmanned Aerial Vehicle (SUAV, also called "Drone"). This invention's cooling system is envisioned to be specifically designed to be connected and attached to a specific drone according to its mechanical elements.

This disclosure focuses on the system as a whole as well as the electronic control strategy. Because the electronic control system utilizing smartphone communication for monitoring and control and other sensing options is the most accurate, flexible and easy to operate, it is envisioned as the preferred embodiment. Other options such as incorporating a manual, electromechanical or thermostatic $CO_2$ releasing mechanism are envisioned.

The present invention, either standalone or embedded in a specially designed insulated cooler, can be applied to refrigerate, cool or freeze individual bottles, cans or containers, insulated or non-insulated portable units (i.e.: ice chests, coolers, lunch boxes), stationary units (i.e.: refrigerators, freezers), compartments of vehicles (i.e.: trunk or other cabinets of trucks, cars, motorcycles, scooters, bicycles or autonomous vehicles), compartments of aircrafts or small containers transported by drones.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is an exploded view of the present invention in the first variation with a valve operated manually;

FIG. 2A is a cross-sectional view of the manifold block;

FIG. 4 is an exploded view of the manual valve;

FIG. 4A is a cross-sectional view of the manual valve;

FIG. 5 is a representation of the second variation of this invention where the release valve is operated electronically;

FIG. 5A is a cross-sectional lateral view of the electronic release valve;

FIG. 5D illustrates the block diagram of the electronic control device;

FIG. 6 is a representation of the third variation of the present invention with a release valve operated thermostatically;

FIG. 6A is a cross-sectional view of the thermostatic valve;

FIG. 6B is an exploded view of the thermostatic valve;

FIG. 7 is a representation of the fourth variation of the present invention with a release valve activated by an electronic solenoid;

FIG. 7A is an exploded view of the manifold block including the electronic solenoid;

FIG. 8A is a cross-sectional view of FIG. 8 to show the cross-sectional components illustrated in FIG. 1;

FIG. 8B is a representation of the interior components of the fourth variation illustrated in FIG. 8 with the top plate removed;

FIG. 8C is an exploded view of the fluid communication assembly of the fourth variation of the invention's cooling system;

FIG. 8E is a cross sectional view of the ⅛" cross fitting member;

FIG. 11D is a prospective view of the water containment tray used in the ice making accessory mechanism;

FIG. 11E is a prospective view of the water divider used in the ice making accessory mechanism;

FIG. 29 is a schematic of a hybrid cooler illustrating two cooling systems for a cooler with one of the cooling systems having a traditional power source and the other cooling system being in accordance with the present invention gas/liquid canister.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Defined broadly, the present invention is an apparatus and method for maintaining items such as beverages, food and other items in need of refrigeration in a cool, cold or freezing temperature to preserve the items for an extended period of time, as required by the item.

Figure 1:
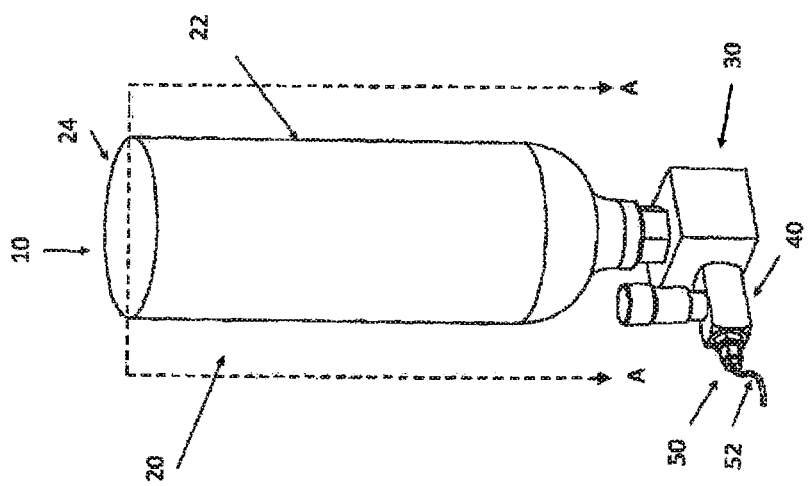
FIG. 1 is a perspective view of one embodiment of the present invention cooling apparatus utilizing a single $CO_2$ cylinder threaded into a single manifold block which in turn is connected to a valve which in turn is connected to a capillary, the valve operated manually (first variation)
Figure 1A:
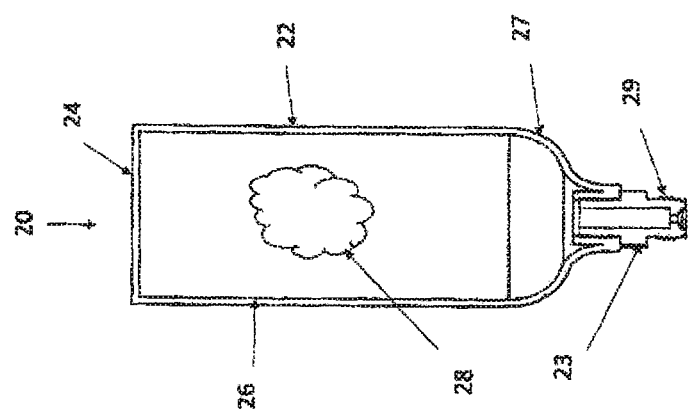
FIG. 1A is a cross-sectional view taken along line A-A of FIG. 1 to show the cross-sectional components illustrated in FIG. 1.
Figure 1B:
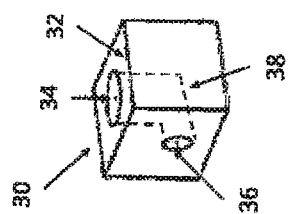
FIG. 1B is an exploded view of the components in FIG. 1 illustrating the single $CO_2$, manifold and other components in their separate condition.

Referring to FIGS. 1, 1A and 1B, there is illustrated an embodiment of the present invention cooling system utilizing a single $CO_2$ cartridge. There is illustrated as a system 10 a single $CO_2$ cartridge 20. The $CO_2$ cartridge 20 has an exterior circumferential wall 22 and a top wall 24 surrounding a first interior chamber 26 which contains $CO_2$ 28 under pressure. The bottom of the cartridge 20 is connected through a curved circumferential wall 27 to a tube member 23 which has threads 29 thereon. Also illustrated is the block manifold 30 having a top 32 with internal threads 34 leading to a second interior chamber 36. The second interior chamber 36 is surrounded by an L-shaped tube 38 (shown in dashed lines) that extends from the tube 29 of the $CO_2$ cartridge 20 and ending in a manual valve 40. The valve in turn is in fluid communication with a capillary unit 50 having a capillary tube 52 in fluid communication with tube 38.

Referring to FIG. 2, there is also illustrated an exploded view of the system 100 with the $CO_2$ cartridge 120, the manifold block 130 which is connected to the manual valve 140 through the member 149 which has a cavity to allow the passage of $CO_2$. The capillary tube 150 is connected to the manual valve 140 through a threaded member 159 having an internal cavity to allow the passage of the $CO_2$.

FIG. 2A is a cross-sectional view of the manifold block 130 having a manifold internal chamber 132 obtained from the manifold block 135, the manifold internal chamber 132 having an internal wall 131, being fixed to the block through the first circumferential wall 136 and being connected to the cavity 137 through the second interior chamber 133, thus forming an L-shaped tube which allows the passage of the $CO_2$ from the refillable tank or cartridge 120 to the valve 140 of FIG. 2.

Figure 3:
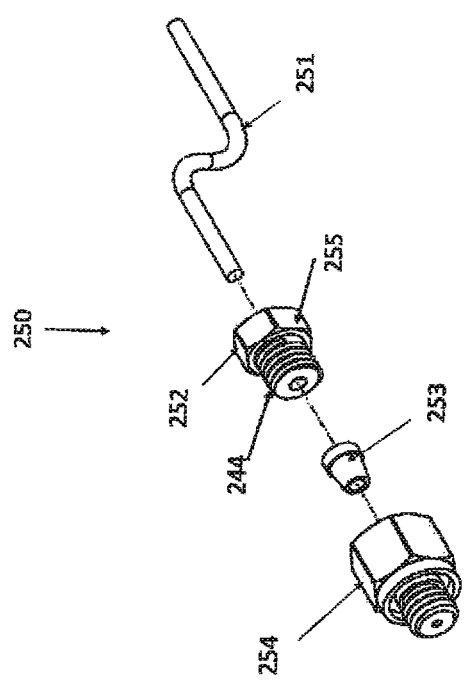
FIG. 3 is an exploded view of the capillary assembly.

Referring to FIG. 3, there is illustrated a cross-sectional view of the capillary unit 250 with the tube element 251 connected to a bolt 255 having a hollow opening 252 to allow the passage of $CO_2$ 28 and having an external male threads 244 mating where the female thread mating 254 is screwed into through the connector junction 253.

FIGS. 4 and 4A illustrate an exploded view and a cross-sectional view of the manual valve 340 respectively, which has a stem 342 going into the main body 347, having a top side 341, an O-ring 343, and two threaded cavities 344 (inlet), and 346 (outlet) respectively which have the purpose to connect the valve to the manifold block 130 of FIG. 2 from one side, and to the capillary unit 250 of FIG. 3 from the other side.

Figure 5B:
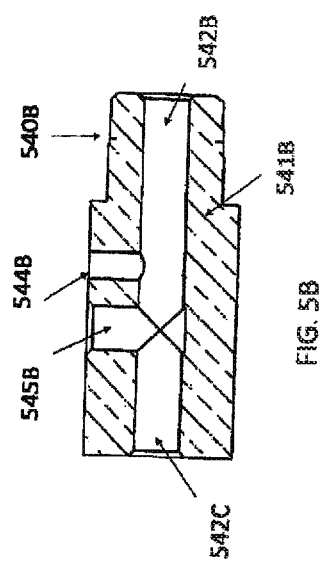
FIG. 5B is another cross-sectional top view of the electronic release valve.
Figure 5C:
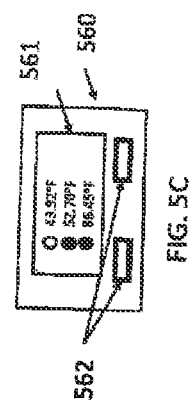
FIG. 5C illustrates an electronic display where the temperatures outside, inside and at the upper surface of the heat exchanger are visualized and controlled.

Referring to FIGS. 5, 5A, 5B and 5C, there is illustrated a second variation of the present invention cooling system utilizing a single $CO_2$ cartridge as illustrated in FIGS. 1 and 1A operated by an electronic valve 540 and an electronic control device 560. The electronic valve 540 is located between the manifold block 530 having the same technical characteristics of the one described in FIGS. 1B and 2A and the capillary unit 550 as illustrated in FIG. 3. The member 543 serves as a connector junction between the manifold block 530 and the capillary unit 550. The electronic control device 560 evaluates the temperature of the cooler and its surroundings and electronically opens the electronic valve 540 to release liquid $CO_2$ 28 through a capillary 550 until a set threshold temperature inside the cooler is achieved. The electronic control device has been specifically designed with a display 561 showing three controlled temperatures (outside the cooler, inside the cooler and at the upper surface of the heat exchanger) and two configurations buttons 562. A schematic diagram of the electronic control device is set forth in FIG. 5D. FIGS. 5A and 5B represent two different cross-sectional views of the electronic valve respectively 540A and 540B with the valve body 541A and 541B which has a valve stem 544A and 544B, a valve plunger 542A, 542B, 542C, two disks, a conduct opening 545A and 545B where the $CO_2$ pass by.

FIG. 5D represent a schematic view of the electronic control device. The control device has 9 subsystems in its electronics. Each system is specifically tuned to work in conjunction with every other system in the network, providing maximum interoperability. The primary system is the MCU 568 which interprets all input and determines output from those factors.

Then there are the output systems. These consist of the Display 561, the Valve (through the Step Up Converter) 540, the Bluetooth Radio 564, and the Indicator Lights 566. The Display 561 is responsible for outputting all information to the user, except what is provided by the indicator lights 566; however, there may be redundancy between the information conveyed. The Valve controls the flow of $CO_2$ in the system and thus, regulates temperature. The Bluetooth Radio 564 provides a means of communication between the companion app and also functions as an input. The Indicator Lights 566 are responsible for making available the most important information to the user.

Related to the output systems are the input systems. These include the Touch Screen 562, the Digital Temperature Sensors 565, and the Bluetooth Radio 564. The Touch Screen 562 provides all input to the device save for what is provided by the companion app, there may be overlap between the two. The Digital Temperature Sensors 565 are responsible for sensing the temperature, they are digital to provide a greater degree of accuracy and precision. The Bluetooth Radio 564 functions as a means of communication between the companion app and the Frostime unit. It also functions as an output.

In addition to those systems mentioned above, the electronic control device also has two systems required for full operation. These are the Storage system 567 and the Step Up Converter 563. The Storage system 567 stores all data collected by the electronic control device so that it may be retrieved later, it may be thought of as an input and output for the MCU 568 but is not intended to be directly accessed by the user. The Step Up Converter 563 is required to couple the MCU 568 and the Valve systems 540 together due to their electrical differences.

Figure 5E:
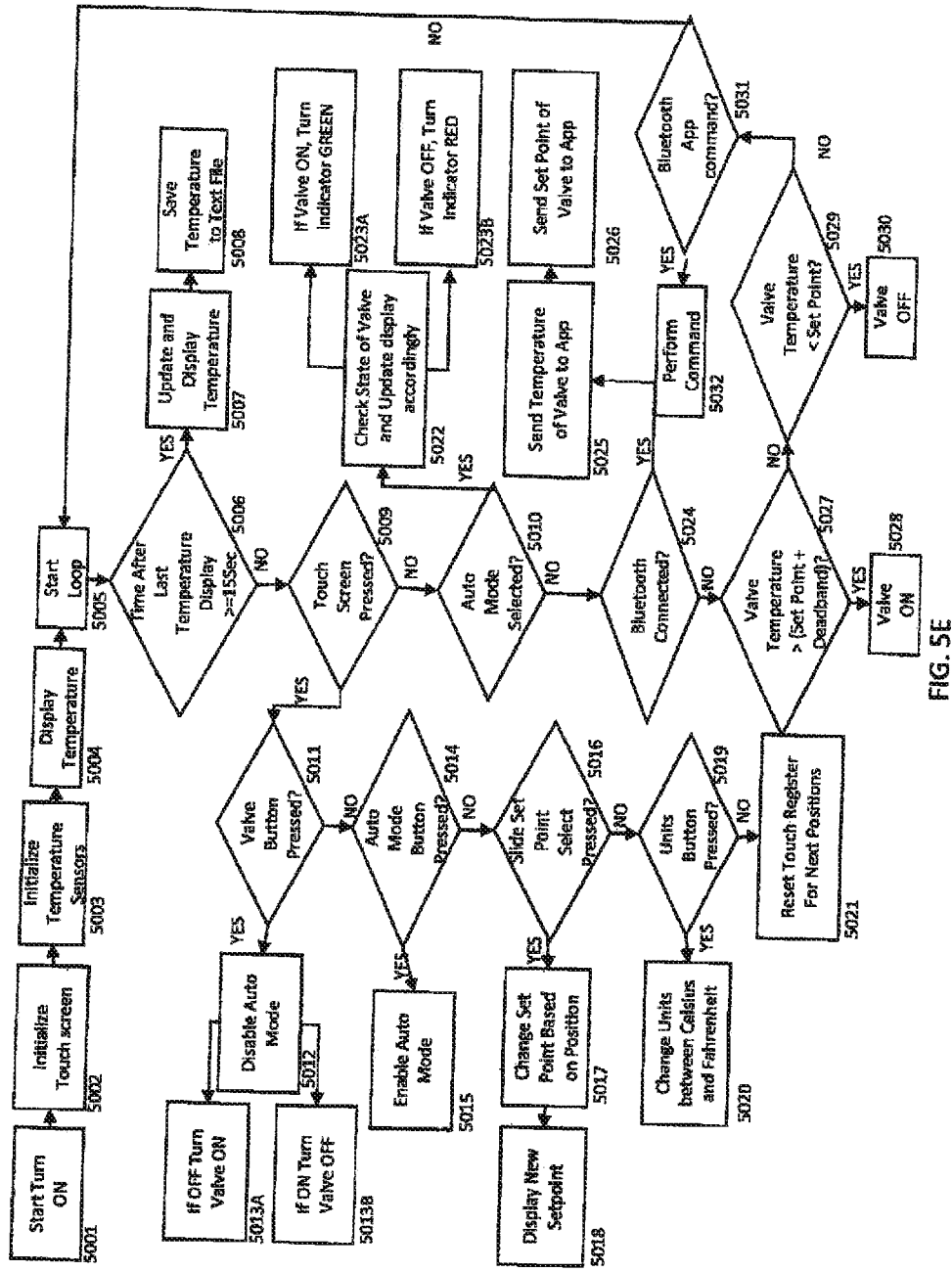
FIG. 5E illustrates the flowchart of the software program running on the electronic control device hardware.

FIG. 5E is a representation of the electronic control device software flowchart. The moment the power switch is toggled into the "On" position 5001 by the user, the electronic control of the invention's cooling system begins its startup routine labeled 5000. The routine proceeds as follows. First the Touch Screen/Display module 5002 is powered and initialized. Then the temperature sensors 5003 are initialized.

After all sensors and hardware has been initialized, the temperature is displayed 5004 to the display and the control unit software enters its primary operating routine 5005. This routine conditionally executes subroutines based on measurements performed and preset timers. It is responsible for changing the valve from open to close to regulate temperature based on data from the temperature sensors, as well as detecting and handling input from the touchscreen and displaying data to it.

The first condition checked 5006 is whether or not the displayed temperature has been updated in the last 15 seconds. If it has not been, the temperature on the display is updated 5007 and also saved to a log file 5008. Next, regardless of the previous condition, the control electronic software checks if the touch screen has been pressed 5009. If this is true, it checks specifically if the valve button was pressed 5011, If so, Auto mode is disabled 5012 and the position of the valve is toggled from its current state to the opposite one (open to close 5013A, close to open 5013B).

If the valve button was not pressed 5014, but there was still a touchscreen touch detected 5009, the Auto Mode is enabled 5015. In this mode the device will open and close the valve to maintain the set temperature, further description of this mode can be gained in the additional description of the main routine below.

If none of the above touch screen events have occurred, but there was still a touch, the control software then checks if the touch was in the sliding temperature adjustment interface 5016. If it was, the graphic slider is adjusted to represent the set temperature 5017 and the new set point is displayed 5018. It does so by changing its rightmost endpoint to the point of touch.

If neither the valve, the auto mode, nor the slider were touched, the control software of the invention's cooling system performs one last check 5019 to see if its units' button has been touched. If so the units are toggled from Fahrenheit to Celsius or Celsius to Fahrenheit depending on the initial units at the time of the press 5020. Finally, in the event of a touch, after all buttons are checked, the internal touch registers containing information about where the touch took place are reset in order to be ready for the next touch event 5021.

After checking the touch screen for input 5009, the control software of the invention's cooling system checks if auto mode is enabled 5010, if so it echoes the valve's current state 5022 to the display via a green light to represent an On valve 5023A and a red light to indicate and Off valve 5023B.

Then Bluetooth Connectivity is checked 5024. If it is connected, then the temperature of the valve is sent to the app 5025 as well as the temperature the device is set to maintain 5026.

Next, the device checks the temperature. If this temperature is above the set point selected by the user plus a small preset deadband value 5027 to reduce unnecessary cycling of the valve, the valve is opened 5028. Next, the device checks if the temperature is below the set point minus a small preset deadband value 5029. If this is the case, the device's valve is set to the off, closed position 5030.

Finally, the device performs another check 5031 for any received Bluetooth commands. If one command was received, it is executed 5032.

This concludes the primary operating routine; it is repeated 5033 until the power switch is switched to the "Off" position.

Referring to FIGS. 6, 6A and 6B, there is illustrated a third variation of the present invention utilizing a thermostatic poppet valve 640. The thermostatic poppet valve 640 is specially designed and allows the liquid or gas $CO_2$ 28 to flow from the $CO_2$ cartridge 620 screwed onto the manifold block 630 to the capillary tube 650 connected to the thermostatic poppet valve 640 through the connector 652.

FIG. 6A displays a cross-sectional view of the thermostatic poppet valve 640 in the closed position. The body of the valve 640A has a head 641 which encapsulates a wax or polymer. As the temperature increases, the polymer or wax expands and pushes down plunger 642, allowing flow from the entrance from the pipe nipple 645 to the exit 649. The spring 648 applies force to the plunger to prevent it from not sealing when the unit is not under pressure, this is called preloading. A pressure relief hole 643 prevents the forming of a too great stress caused by too much pressure in the unit in cases of unusually extreme pressures. Set screw 646 is used in conjunction with a set screw hole 651 to retain the spring and allow the passage of fluid. Parts 644A, 644B and 644C are sealing O-rings. Part 641A is a jam nut to allow the thermostatic poppet valve 640 to be placed at the correct depth. Part 640A is the main body of the thermostatic poppet valve 640 and this can also be considered a manifold.

FIG. 6B displays the exploded view of the thermostatic poppet valve 640 having the main body 640A which has a thermostatic actuator 641 and is connected to the manifold block through a set of screws 647A and 647B. On the opposite side of the main body 646 is a set screw with a hole to retain the spring 648 and allow the passage of fluid.

Figure 7C:
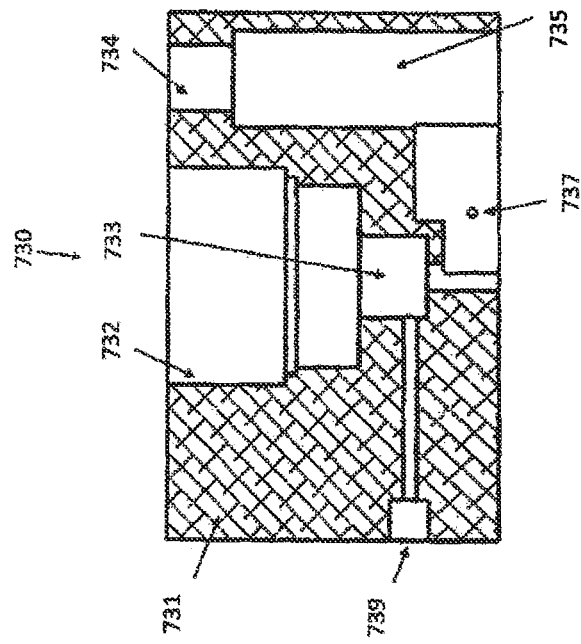
FIG. 7C is a cross-sectional view of the manifold block including the electronic solenoid.
Figure 7B:
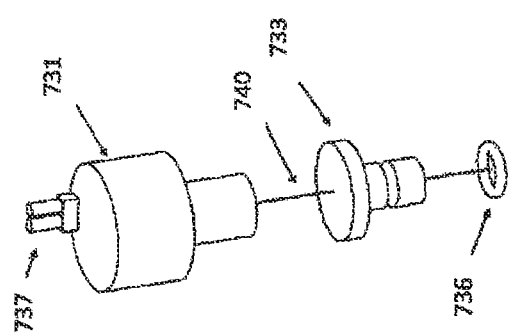
FIG. 7B is an exploded view of the electronic solenoid.

Referring to FIGS. 7, 7A, 7B and 7C there is illustrated a fourth variation of the present invention which uses a solenoid valve included into the manifold block which replaces the release valve's operation of the previous six variations and allows the flow of the liquid or gas $CO_2$ to pass directly from the canister to the capillary assembly. FIG. 7 represent an exploded view of an upside-down $CO_2$ canister 720 having the identical cross-sectional view as illustrated in FIG. 1A and operated by an electronic solenoid 731 which allows the flow of the $CO_2$ to the capillary assembly 750 which comprehends the same elements as detailed in FIG. 3. When the electronic solenoid 731 is actuated, it presses on the lever linage 734 and 735 illustrated in FIG. 7A, and opens the valve on 720 to allow the flow of $CO_2$. In this variation the valve is electromechanically controlled by an electric current through a solenoid.

FIG. 7A illustrates an exploded view of manifold 730 including a solenoid 731, a preload spring 737, a shaft 732, a plunger 733, a lever hinge pin 734 and an actuator lever 735.

When normally closed, a plunger return spring 737 holds the plunger 733 against the orifice of the $CO_2$ canister, preventing flow through the valve. When the solenoid is energized, a magnetic field is produced, actuating the lever and in turn raising the plunger and allowing flow through the valve.

FIG. 7B is an exploded view of the electronic solenoid comprised of a main coil 740, plunger 733, O-ring 736, and wire leads 737.

FIG. 7C illustrates a cross-sectional view of manifold 730 with outer wall 741, $CO_2$ canister receptacle 732, $CO_2$ chamber 733, solenoid threads 734, shaft cavity 745, lever hinge pin hole 737, and fluid communication outlet 739 which is in communication with the capillary assembly 750 illustrated in FIG. 7.

Multiple solenoid valves can be placed together on a manifold thus reproducing configuration with three $CO_2$ canisters upside-down.

Figure 8:
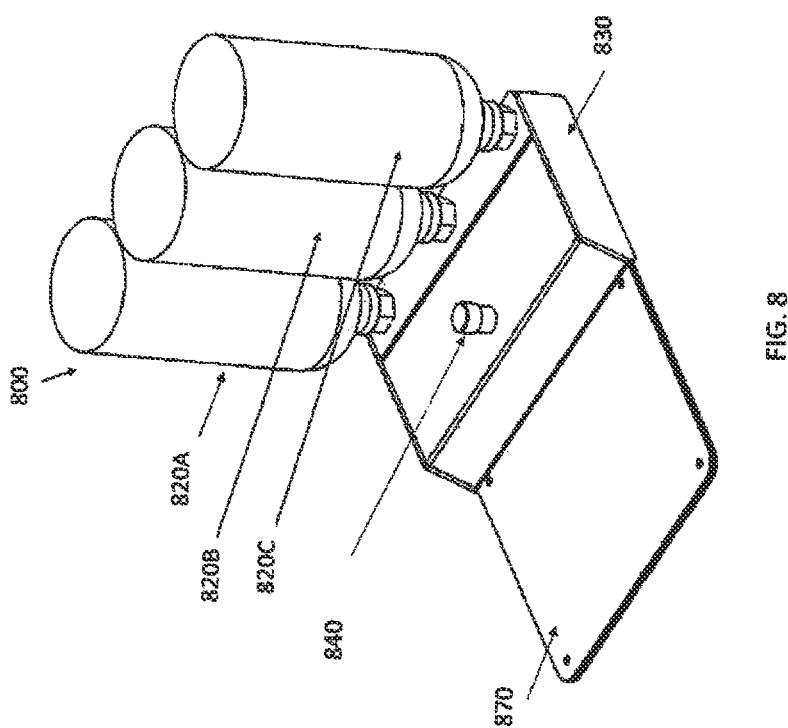
FIG. 8 is a representation of the fourth variation invention's cooling system in the variation with three $CO_2$ canisters and with a release valve manually operated.

A more common embodiment for the present invention is to use a multiplicity of inverted $CO_2$ cylinders. By way of example, one preferred embodiment is to have three $CO_2$ cylinders. Referring to FIG. 8, there is illustrated the embodiment of the present invention cooling system having a multiplicity of upside down $CO_2$ containers and in this case, three $CO_2$ containers. The embodiment is numbered with the series 800 and represents the fifth variation of the present invention.

FIG. 8A is a cross-sectional view of one of the upside down $CO_2$ containers 820A to illustrate the details of the components. Specifically, cylinder 820A has an exterior wall 822A and a top 824A which surround an interior chamber 826A containing $CO_2$ 828A under pressure. Similarly, as illustrated in the exploded view in FIG. 1A, the bottom of the inverted $CO_2$ cartridge 820A contains a tube 823A surrounded by threads 829A. It will be appreciated that although cross-sectional views of the other two inverted $CO_2$ cylinders are not shown, they have the same internal configuration. Internal $CO_2$ cylinder 820B has an exterior wall 822B and a top 824B which would surround an interior chamber containing $CO_2$ under pressure. Similarly, $CO_2$ container 820C which has an exterior wall 822C and a top 824C which surrounds an interior chamber containing $CO_2$ under pressure. The three $CO_2$ cartridges 824A, 824B and 824C are operated by a manual valve 840 and they are threaded into a manifold block 830 which is connected to a heat exchanger 870. It will be appreciated that although cross-sectional views of the manual valve are not shown, they have the same configuration as illustrated in FIGS. 4 and 4A. A diagram of the heat exchanger is set forth in FIG. 8B and an exploded view of the valves' system for the embodiment with three $CO_2$ cylinders is set forth in FIG. 8C.

Figure 8D:
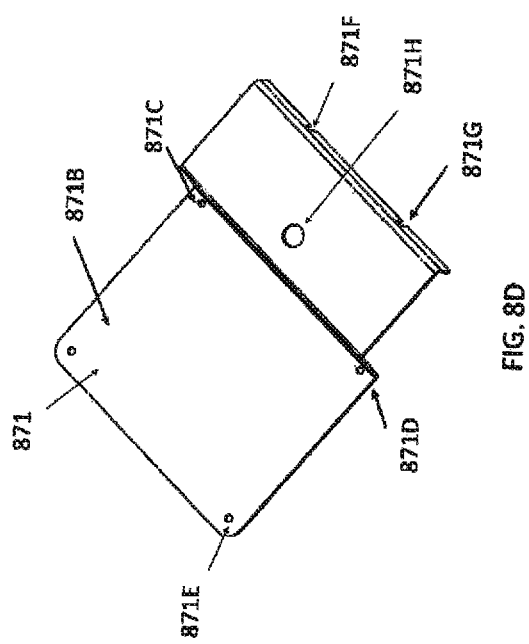
FIG. 8D is a representation of the top plate which covers the heat exchanger.

In FIGS. 8B and 8C there is illustrated respectively an internal and an exploded view of the embodiment with the three $CO_2$ cylinders 820A, 820B and 820C operated by manual valve 840 without the top plate which is set forth in FIG. 8D and numbered with the series 881. In FIG. 8 there is also illustrated the manifold block 830 having the purpose to connect the three above-mentioned $CO_2$ cylinders to a fluid communication system composed of a manual valve 840, three check valves 890A, 890B and 890C which are fitted into a ⅛" cross fitting member 881 and a capillary tube 850 which has the purpose to convey the liquid or gas $CO_2$ into the heat exchanger 870.

In FIG. 8C there is illustrated an exploded view of the above-mentioned fluid communication system which includes three check valves 890A, 890B and 890C, five connection elements 880A, 880B, 880C, 881 and 892, two connection tubes 891A and 891B and the element 852 in direct connection to the capillary tube 850 which is embedded into the heat exchanger 870.

In FIG. 8D there is illustrated the top plate 871 which is coupled to the main embodiment with screws in the points 871B, 871C, 871D and 871E and through two slots numbered 871F and 871G. The hole 871H is specifically designed to receive the manual valve 840 as illustrated in FIG. 8.

FIG. 8E illustrates a cross sectional view of the ⅛" cross fitting member having four female threads mating 881A, 881B, 881C and 881D where all the other elements of the fluid communication system are connected into.

Figure 8G:
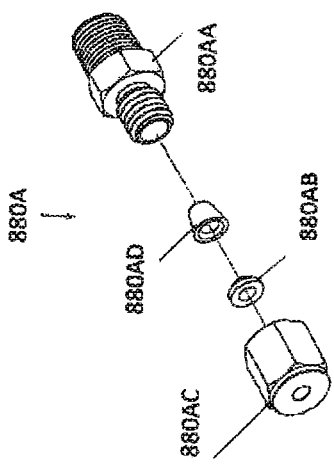
FIG. 8G is an exploded view of the male compression fitting of the check valve.
Figure 8H:
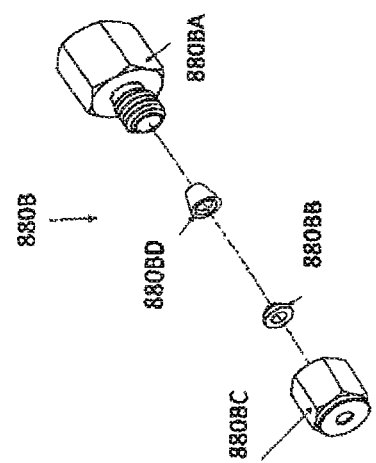
FIG. 8H is an exploded view of the female compression fitting of the check valve.
Figure 8F:
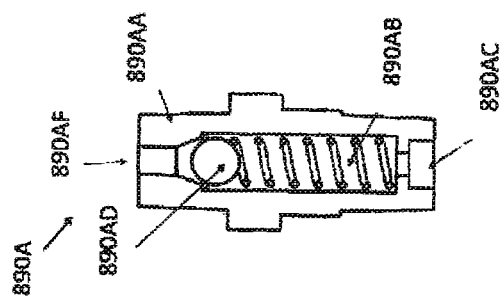
FIG. 8F is a cross sectional view of check valve.

FIG. 8F illustrates a cross sectional view of one check valve 890A. It will be appreciated that although cross-sectional views of the check valves 890B and 890C are not shown, they have the same configuration as illustrated in FIG. 8D. The main body 890AA presents an inlet opening 890AF where the liquid or gas $CO_2$ passes by, goes through the spring 890AB and exits from the outlet 890AC. The ball check in 890AD stops the reverse flow of CO2 if the canister 820 is disconnected from the manifold 830

Referring to FIGS. 8G and 8H there is illustrated an exploded view of respectively a male and a female connection fitting. In FIG. 8G is illustrated one of the two identical male compression fitting 880A, the other one being 880C, which connects the check valve 890A to a tube 891A in communication with the cross fitting member of FIG. 8E through the female compression fitting 880B which is illustrated in the exploded view in FIG. 8H. Both, male and female compression fittings, have connection members, respectively 880AB, 880AC, 880AD in FIG. 8G and 880BA, 880BB and 880BC in FIG. 8H, which are chosen to perfectly fit with the check valves at one end and with the cross fitting member at the opposite end without any kind of leakage.

Referring to FIGS. 9, 9A, 9B and 9C, this illustrates the sixth variation of the invention's cooling system with one complete embodiment operating with an electronic valve in the configuration with three $CO_2$ upside-down cartridges. This variation includes an electronic control as illustrated in FIG. 5D which has a sensor which evaluates the temperature of the cooler and its surrounding to determine what the temperature is and to determine what the required cooling or freezing temperature needs to be achieved. After the electronic control device performs this analysis, the electronic control device electrically opens the electronic valve 940 to release liquid $CO_2$ through a capillary 950 in the heat exchanger plate 970 until a set threshold temperature inside the cooler is achieved. The configuration includes a multiplicity of inverted $CO_2$ cartridges in a manifold block 930 which is affixed to the heat transfer plate 970, and through the manifold block 930, the $CO_2$ cartridges are coupled to the check valves 990A, 990B, 990C which are controlled by the electronic valve 940 which in turn is controlled by the electronic control device 960. Once the electronic control device determines the amount of cooling temperature or freezing temperature required for the specific application, it sends a signal to the electronic control valve 940 to open to permit $CO_2$ from the interior chambers of the cartridges 920A, 920B and 920C to flow through the check valves 990A, 990B, 990C and into the capillary 950 where it is distributed to the location for cooling. The heat transfer plate 970 facilitates the cooling transfer from the capillary to the area to be cooled or frozen. This in effect is the basic principle of the present invention and other variations using different components achieve the same result but different components may be used for different applications.

Figure 9A:
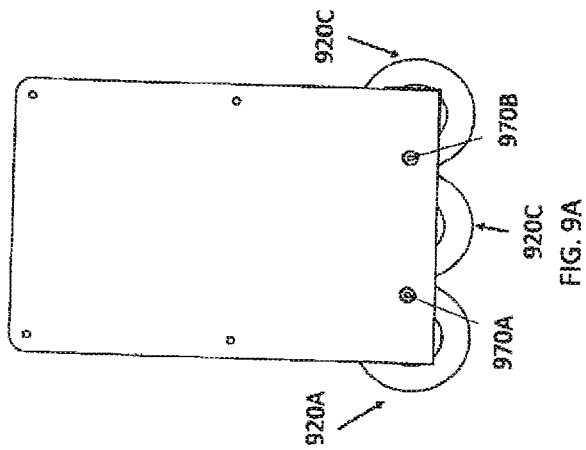
FIG. 9A is a view of the bottom of the invention's cooling system in the fifth variation.

FIG. 9A is a bottom view of the heat exchanger 970 in the variation with three $CO_2$ cartridges 920A, 920B and 920C. Items 970A and 970B affix the heat exchanger plate 970 to the manifold block 930.

Figure 9:
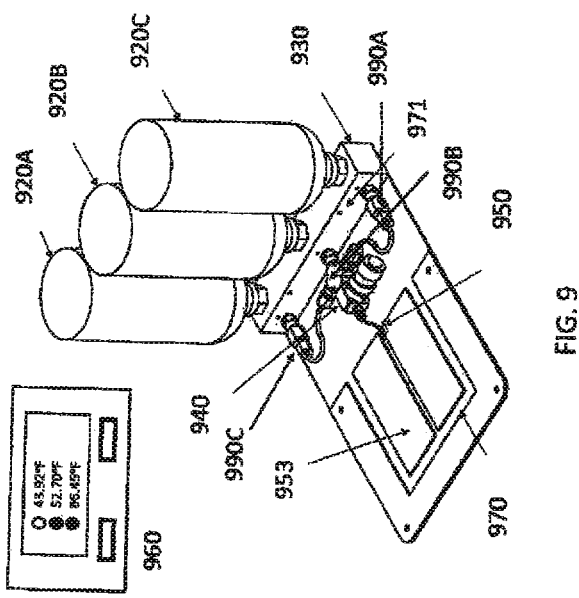
FIG. 9 is a representation of the fifth variation invention's cooling system in the configuration with three $CO_2$ canisters and with a release valve which is electronically operated.
Figure 9B:
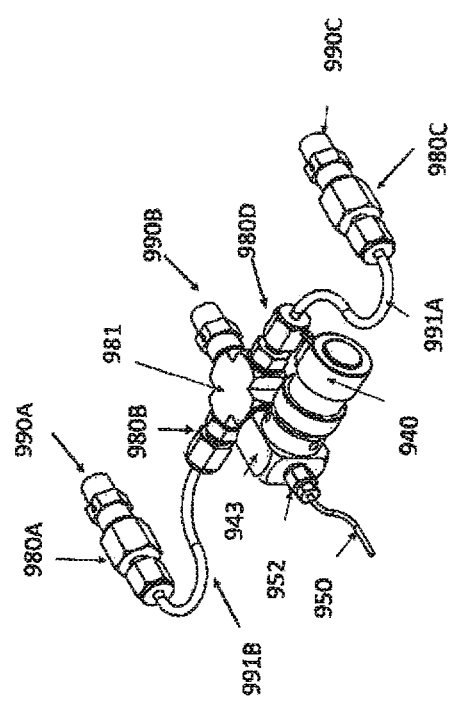
FIG. 9B is a representation of the interior components of the fifth variation illustrated in FIG. 9 with the top plate removed.
Figure 9C:
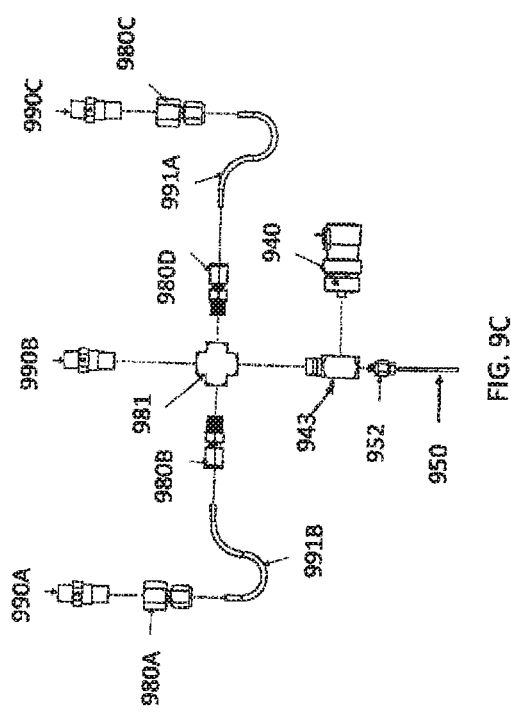
FIG. 9C is an exploded view of the fluid communication assembly of the fifth variation of the invention's cooling system.

FIGS. 9B and 9C illustrate respectively a prospective view and an exploded view of the fluid communication assembly in the sixth variation of the invention's embodiment. The fluid communication system has the same description of FIG. 8A with the only difference represented by the valve which now is an electronic valve 940. The connector member 943 serves as a junction between the manifold block 930 and the capillary unit 950.

Figure 10:
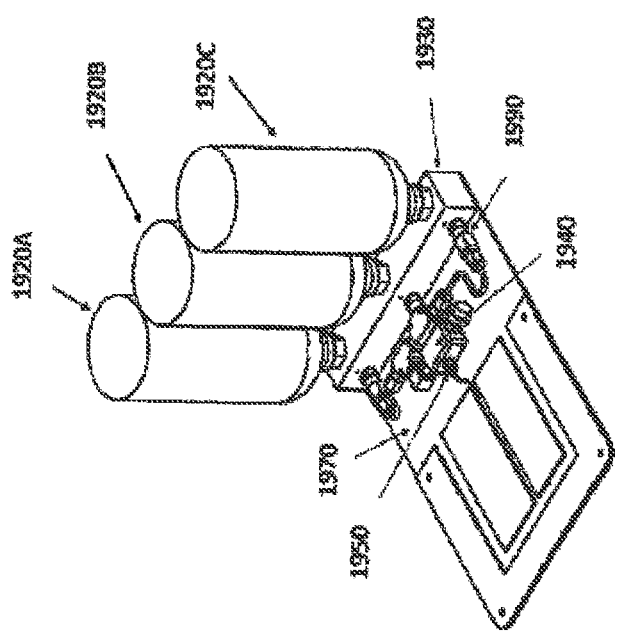
FIG. 10 is a representation of the sixth variation invention's cooling system in the configuration with three $CO_2$ canisters and with a release valve which is thermostatically operated.
Figure 10A:
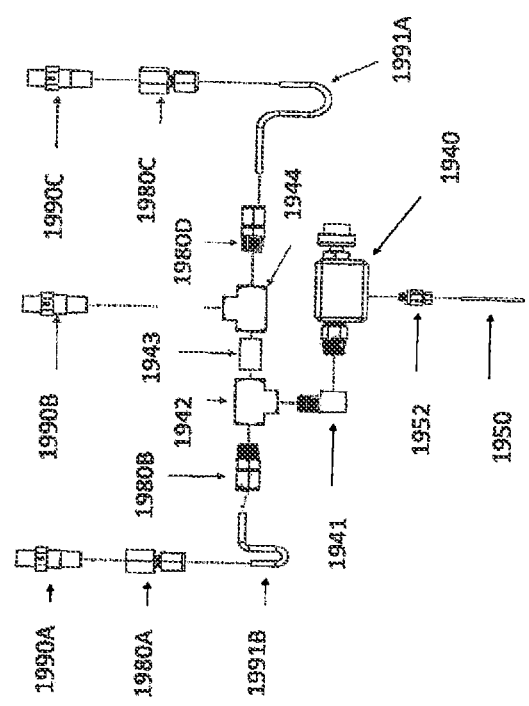
FIG. 10A is an exploded view of the fluid communication assembly of the sixth variation of the invention's cooling system.

FIGS. 10 and 10A are respectively a top perspective view and a fluid communication assembly exploded view of a sixth variation of the present invention which contains the same components described in detail in FIGS. 9, 9B and 9C for the sixth variation of the present invention with the only difference being that instead of having the electronic control 940 to determine how much $CO_2$ needs to be released for the required temperature, that is replaced by a thermostat valve 1940 connected to the fluid communication assembly through the connector members 1942, 1943 and 1944. All of the components are numbered the same with an additional number 1000. For example, instead of each of the cylinders being 920A, the cylinders are now 1920A etc. A polymeric or wax-based thermostatic actuator 1945 is connected to a poppet valve 1940 which releases $CO_2$ through a capillary tube 1950 and into the heat exchanger plate 1970 when the valve is at a predetermined temperature. Wax-based or polymeric thermostatic valves operate by pre-determined temperature. Wax-based or polymeric thermostatic valves operate by exploiting the thermal expansion of wax. As the wax or polymer begins to melt, the wax or polymer expands and opens the valve. As the system begins to cool, the wax or polymer solidifies and closes the valve. The temperature at which the wax or polymer begins to melt is dependent on its formulation and is selected based on its desired operating temperatures. Gas enters through the check valves body 1990A, 1990B and 1990C and then flows through the ⅛" copper tubing 1991A and 1991B. Then the gas enters the ⅛" NPT T connectors that have female threads on all three entrances 1942 and 1944 and goes into a ⅛" NPT 90 deg fitting with on threaded side male and the other threaded side female 1941 to that the thermostatic poppet valve 1940 attaches to. The gas then goes into the capillary assembly 1952 and finally exits the capillary tube 1950. To attach the copper tubing female compression fittings 1980A and 1980C, and male compression fittings 1980B and 1980D are used. To attach the T connectors together a ⅛" NPT nipple 1943 with male threads on both sides is used.

Figure 11:
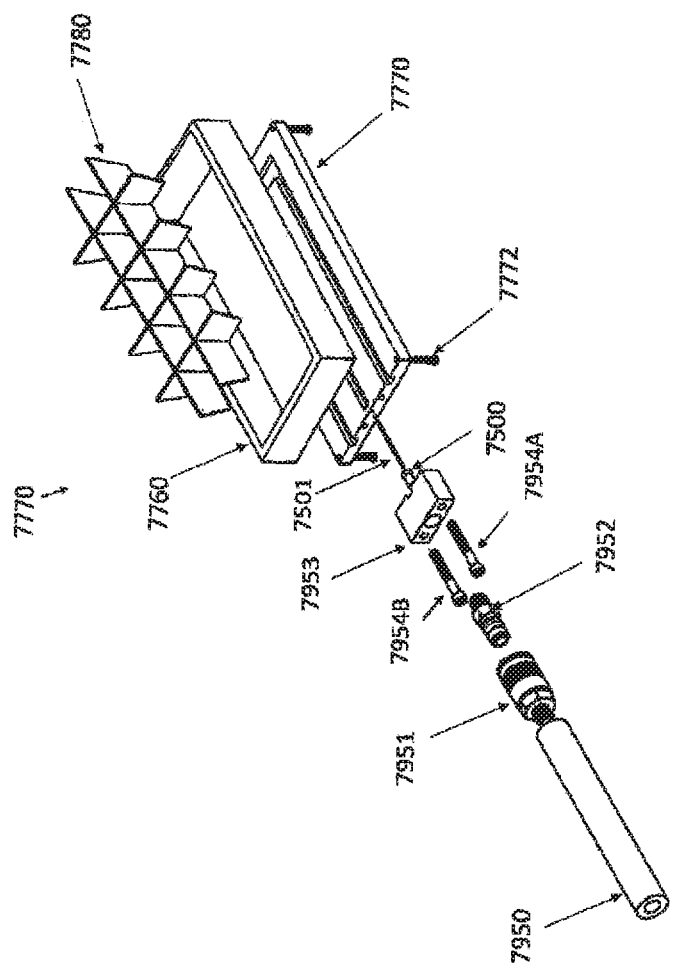
FIG. 11 is an exploded representation of the seventh variation of the invention's cooling system which includes an accessory to make ice in a range of time from 1 to maximum 10 minutes.

Referring to FIG. 11 the design assembly of an ice cube tray that can be attached to a $CO_2$ manifold is illustrated. This is the seventh variation of the invention's cooling system. The mechanism which is illustrated in FIG. 11 allows to form ice in a period of time from 1 to 10 minutes. Exploded view of FIG. 11 highlights the units' components and sub-assemblies. $CO_2$ enters into the entrance hose 7950 and is pushed through a female quick disconnect coupler 7951 and male quick disconnect coupler 7952 into an ice tray block 7953 which is attached to the bottom cold disbursement plate 7770 with ice tray block fasteners 7954A and 7954B. The $CO_2$ then enters the capillary assembly 7500 and exits the capillary tube 7501 into the bottom cold disbursement plate 7770. The cold is then dispersed through the water containment tray 7760 and into the water divider 7780 which will be full of water. The plate assembly is fastened together by the ice tray bottom plate fasteners 7772.

Figure 11B:
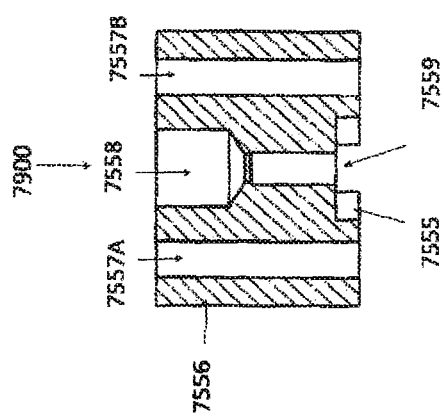
FIG. 11B is a cross sectional view of the block used for the ice tray design.
Figure 11A:
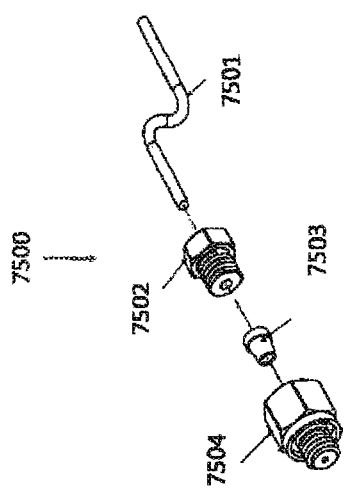
FIG. 11A is an exploded view of the fluid communication assembly of ice making accessory mechanism.

FIG. 11A illustrates an exploded view of the capillary assembly 7500. $CO_2$ enters the capillary tube female fitting 7504 and then enters the capillary tube 7501. To hold the capillary tube in place a capillary tube flare fitting 7503 is used and the capillary tube male fitting 7502 is used to compress the flare and hold it in place.

FIG. 11B illustrates a cross section 7900 of the block used for the ice tray design. Gas enters the ⅛" NPT female thread for fitting 7558 and then exits the 10-32 female thread for capillary attachment 7559. The capillary assemble could not be put on without making a cut out for socket to attach capillary assembly 7955 in order to reduce the overall length. The ice tray block housing 7956 is attached through the ice tray block bolt holes 7957A and 7957B.

Figure 11C:
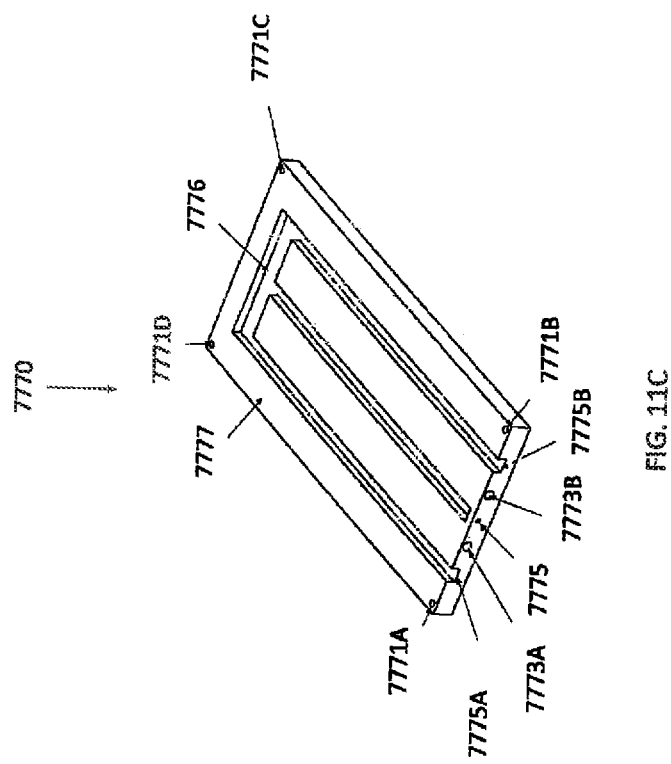
FIG. 11C is a prospective view of the heat exchanger used in the ice making accessory mechanism.

FIG. 11C represents an overall view of the cold disbursement plate 7770. Gas enters through the cold disbursement plate capillary inlet hole 7774 and flows through the cold disbursement plate gas flow channel 7776. The gas then exits through the exit holes 7775. To attach the block, two threaded block fastener holes 7773A, 7773B are included to attach the water tray 760, items 7771A, 7771B, 7771C and 7771D are included. The cold is then dispersed through the water containment tray 7760. For labeling purposes the top of the cold disbursement plate is 7777.

FIG. 11D illustrates an overall view of the water containment tray 7760. As the cold disbursement plate 7770 of FIG. 11C is cooling, the first thing that cools is the water containment tray bottom 7762. As the cold transfers through the containment tray the water containment tray front 7761 and the water containment tray side 7763 also cool.

FIG. 11E represents a water divider 7780. As the water containment tray cools, water divider mating side to the water containment tray 7782 cools first and then the water divider side that separates the water 7783 cools and finally the water divider top 7781 gets cold. The overall freezing process takes from 1 to 10 minutes in total.

Figure 12:
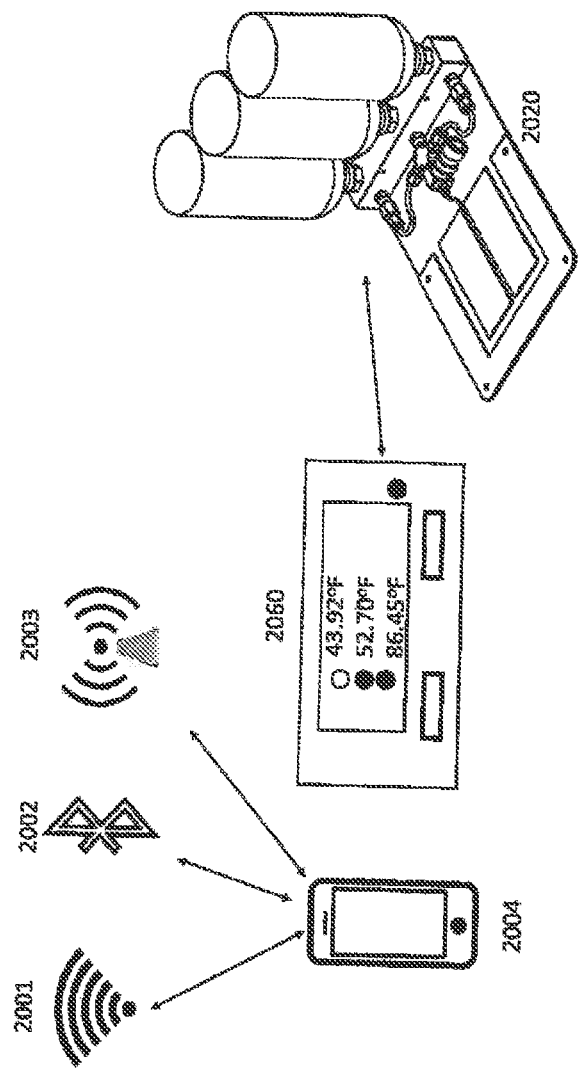
FIG. 12 is a representation of the present invention's cooling system communicating with a smartphone device through Wifi, Bluetooth or Radio-Frequency communication.

Referring to FIG. 12, there is illustrated the representation of data communication between a smartphone 2004 and the electronic control device 2060 which controls the invention's cooling system 2020 via WiFi 2001, Bluetooth 2002 or Radio Frequency 2003 transmission. The communication is handled by the control software as described in FIG. 5E.

Figure 13:
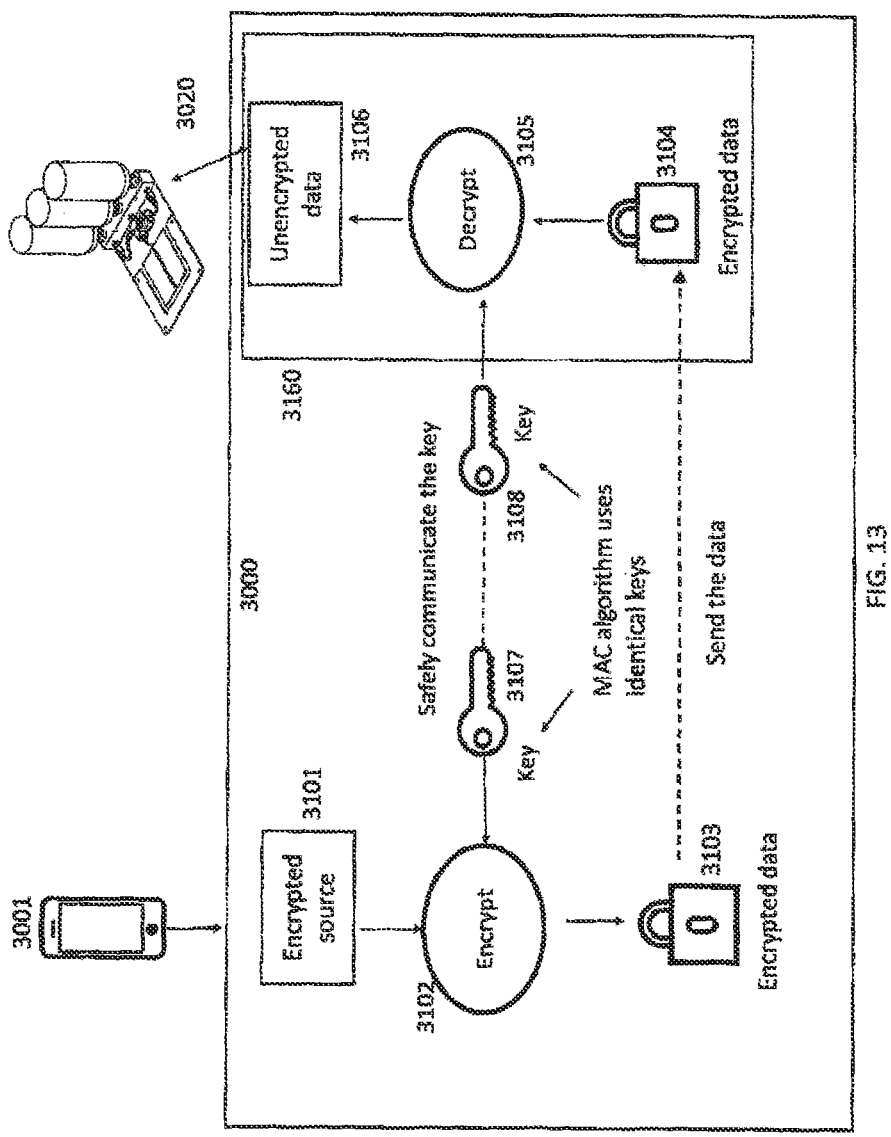
FIG. 13 is a representation of the present invention's cooling system communicating with a smartphone device through Wifi, Bluetooth or Radio-Frequency communication using encrypted algorithm.

Referring to FIG. 13, there is illustrated the representation of data encryption method 3000 between a smartphone 3001 and the electronic control device 3160 which controls the invention's cooling system 3020. To encrypt the transmitted data a message authentication code (MAC) method will be used with identical keys 3107 and 3108. The encryption software is included in the app, data are encrypted 3102, sent over the air using a transmission method as described in FIG. 12. The electronic control software running on electronic control device 3160 will receive encrypted data 3104 and decrypt them 3105 using the MAC algorithm and utilizes the received data to operates the invention's control unit 3020.

Figure 14:
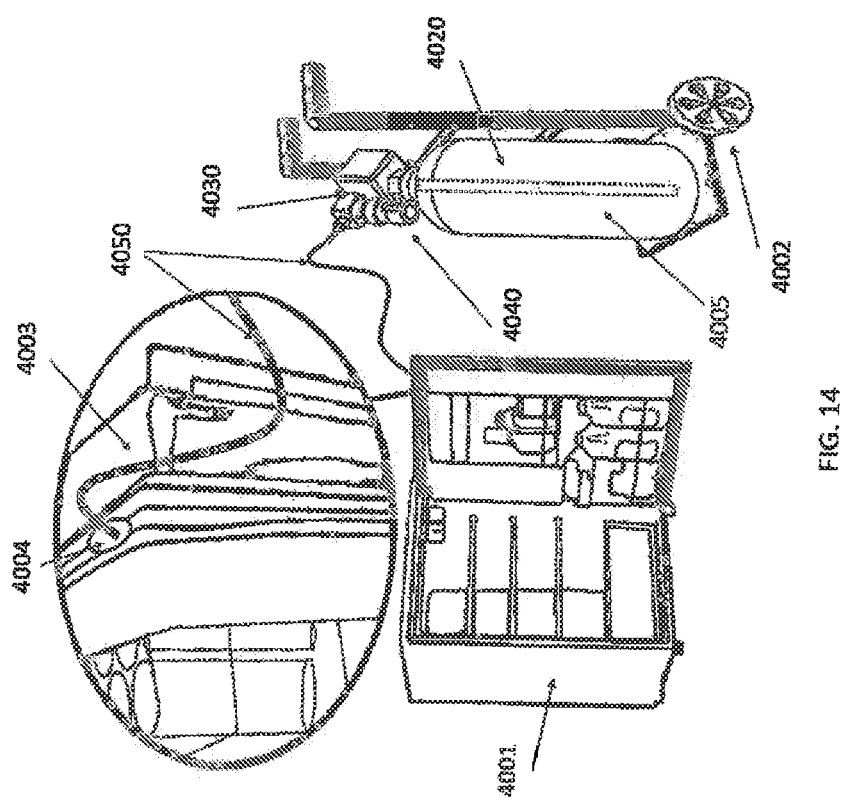
FIG. 14 is a representative example of the use of the present invention cooling system to refrigerate a unit.

FIG. 14 represents the application of the invention's cooling system to a refrigerator unit 4001 which can be used in case of power supply outage of the main power supply. The liquid or gaseous $CO_2$ container 4020 (can be 1, 2.5, 5, 10, 20, 50, or 75 lb portable compressed/liquefied gas cylinders) is placed in up-right position on a transporter equipped with wheel 4002 which is commercially available. The liquid or gaseous $CO_2$ is released through a syphon tube 4005 flowing into a release valve 4040 which can be electronic or manual or thermostat and through an additional capillary tube 4050 which is connected to a refrigerator unit through a hole 4004 in the refrigerator gasket 4003. The release mechanism of the $CO_2$ is the same as described in FIGS. 1 and 2 if manual valve is used, in FIG. 5 if electronic valve is used and in FIG. 6 if thermostat valve is used.

Figure 15:
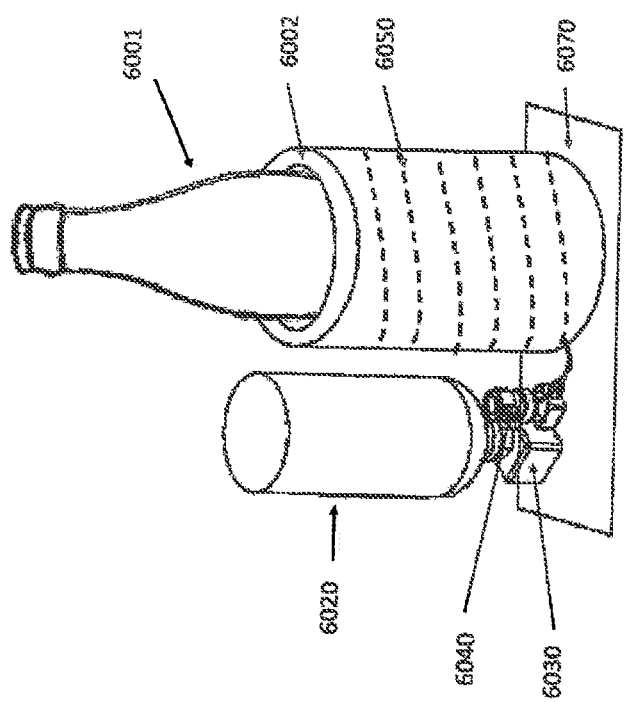
FIG. 15 is a representation of the application of the invention's cooling system to portable individual containers for beverages such as cans or bottles, expressed breast milk or other beverages or foods or items that need to be cooled or to be maintained at a controlled temperature.

In FIG. 15 is represented the application of the invention's cooling system to refrigerate, cool or freeze an individual item 6001 where a small cylinder of liquid or gaseous $CO_2$ 6020 i.e. 12 g disposable metal canister (soda fountain cartridge) and a coolant chamber 6002 with the capillary tube(s) 6050 wrapped around the cooling chamber 6002 are utilized. The small cylinder 6020 is affixed to a manifold block 6030 and releases liquid or gaseous $CO_2$ to a release valve 6040 which can be which can be electronic or manual or thermostat. The release mechanism of the $CO_2$ is the same as described in FIGS. 1 and 2 if manual valve is used, in FIG. 5 if electronic valve is used, in FIG. 6 if thermostat valve is used and in FIG. 7 if electronic solenoid is used.

Figure 16:
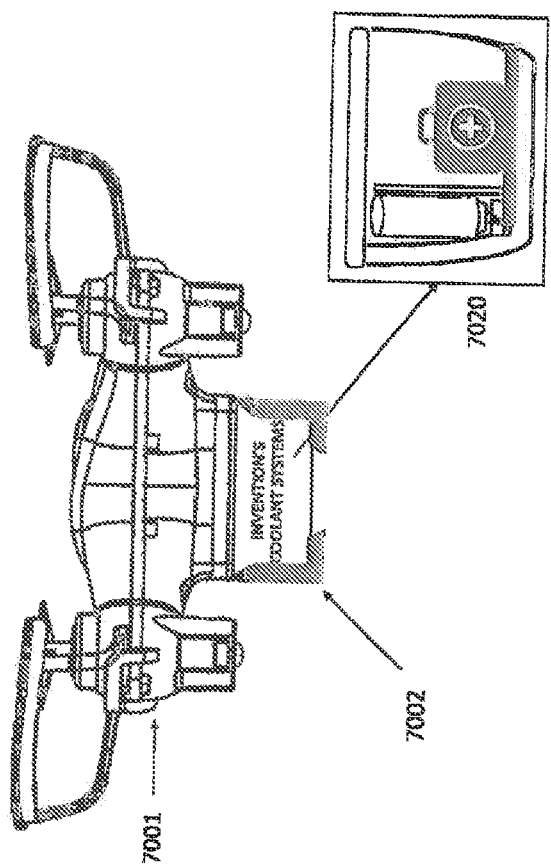
FIG. 16 is a representation of the application of the present invention cooling system to items which need to be maintained refrigerated, cooled, or frozen and need to be transported using a small unmanned aerial vehicle also called drones.

In FIG. 16 is represented the application of the invention's cooling system to a refrigeration unit transported by a Small Unmanned Aerial Vehicles (SUAVs, also called "Drones") 7021. The invention's cooling system 7020 having a small $CO_2$ cartridge i.e. 12 g disposable metal canister (soda fountain cartridge) 7020 similar to the one described in FIG. 15. The invention's cooling system is protected in an insulated or non-insulated box which is fixed with screws on a base 7002 attached to the drone.

Figure 17:
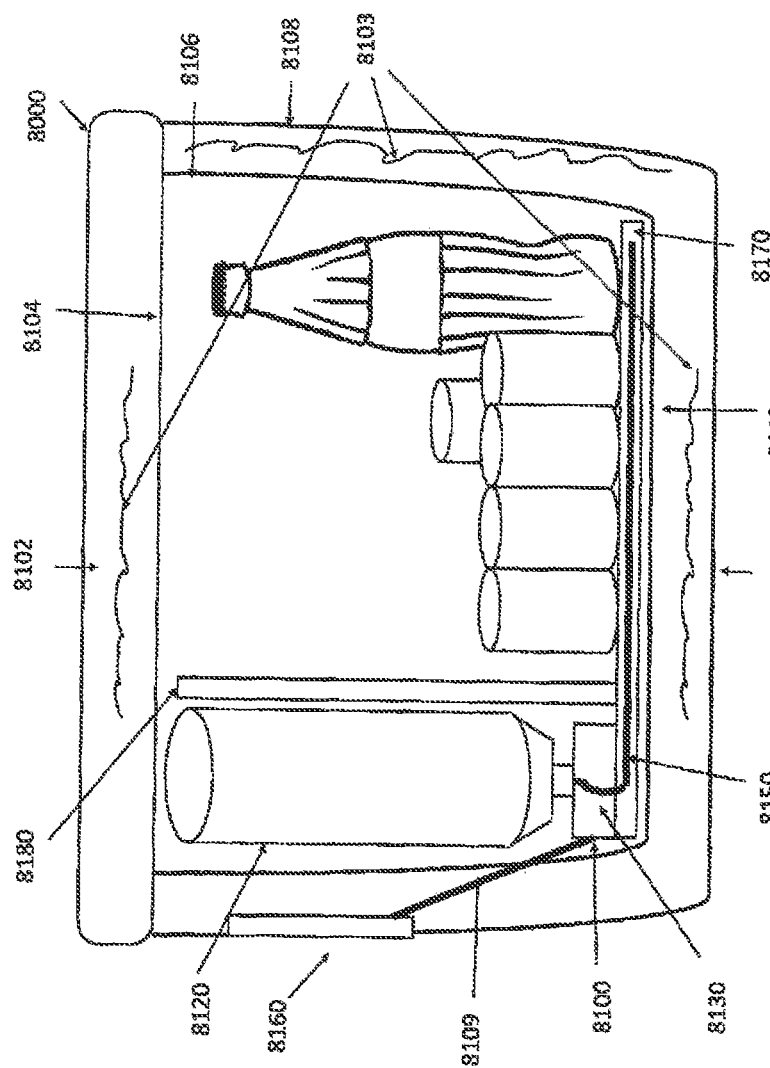
FIG. 17 is a representation of the present invention's cooling system embedded in a cooler which includes the electronic unit control.

Referring to FIG. 17, there is illustrated the representation of a cooler 8000 with the invention's cooling unit embedded in. The cooler has a top upper lid 8102 and a top lower lid 8104 containing insulated material 8103 in between. Same insulated material 8103 is placed between the inner lateral wall 8106 and external lateral wall 8108 and between the bottom external wall 8112 and bottom internal wall 8110. On one of the lateral wall the electronic control device 8160 is placed on. The said electronic control device is wired in connection 8109 with the invention's cooling unit 8100 having 3 upside-down $CO_2$ canisters 8120, a capillary tube 8150, a heat exchanger 8170 and a manifold block 8130 to screw into the $CO_2$ canisters. An internal wall 8180 with the function of a separator between the invention's cooling unit and the compartment for beverages and food is also illustrated.

The following text discloses variations of embodiments discussed in the parent application. In previous Figures, $CO_2$ containers were the source of refrigerant. While $CO_2$ containers are also illustrated in the following figures beginning with FIG. 18, it is the intent of the present invention to include a multiplicity of other gasses to provide cooling. The additional gasses intended to be used in place of $CO_2$ for cooling are: any gas that is capable of being compressed into a liquid at pressures up to and including 3000 psi that will undergo an expansion and phase change upon release into ambient conditions. Examples are selected from the group consisting of propane, $CO_2$, methane, butane, nitrous oxide and refrigerants such as R-22, 134B and 410A.

Figure 18:
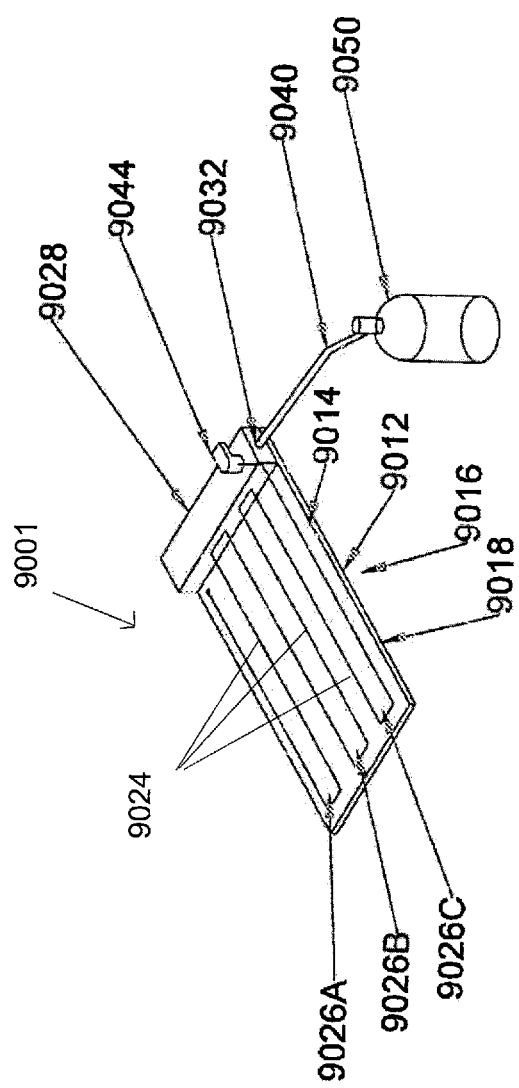
FIG. 18 is a schematic of the present invention's spot cooling system used with a flat plate that may be rigid or flexible.

Referring to FIG. 18, there is illustrated a flat plate $CO_2$ cooling system 9001 designed to provide remote refrigeration of food items located on a flat plate 9012 which can be flexible or rigid. The number of specific uses should not be limited by this disclosure, but this disclosure is intended to show examples of how the flat plat cooling system 9001 embodiment may be used. FIG. 18 illustrates a flat plate 9012 having a flat plate top surface 9014 and a flat plate bottom surface 9016 that are connected by a flat plate vertical wall that surrounds the entire perimeter of flat plate 9012. The distance between flat plate top surface 9014 and flat plate bottom surface 9016 is large enough to contain tubing or capillary tubes (such as capillary tube 11000 illustrated in FIG. 28) within tubing routes 9026A, 9026B, and 9026C. Tubing routes 9026A, 9026B, and 9026C and capillary tubes 9024 contained within tubing routes 9026A, 9026B, and 9026C may be of different number and size to correspond with the desired size of the plate. FIG. 18 also illustrates a $CO_2$ container 9050 that is connected to the manifold block 9028 by a flexible discharge line 9040 that connects through a manifold block hole 9032 in the manifold block 9028. Solenoid valve 9044 controls the amount of $CO_2$ entering manifold block 9028 from $CO_2$ container 9050. The details of solenoid valve 9044 of this embodiment and its operation in controlling flow between manifold block 9028 and $CO_2$ container 9050 are identical to those previously disclosed in FIGS. 7 and 7A. The flexible rigid or flat plate disclosed in FIG. 18 may be used for buffets and picnics while serving. The complete system consists of a flat plate as illustrated in FIG. 18 where the open container item is placed on flat plate 9012 and cooled by means of conduction to reduce the risk of foodborne pathogens while the food is served.

Figure 19:
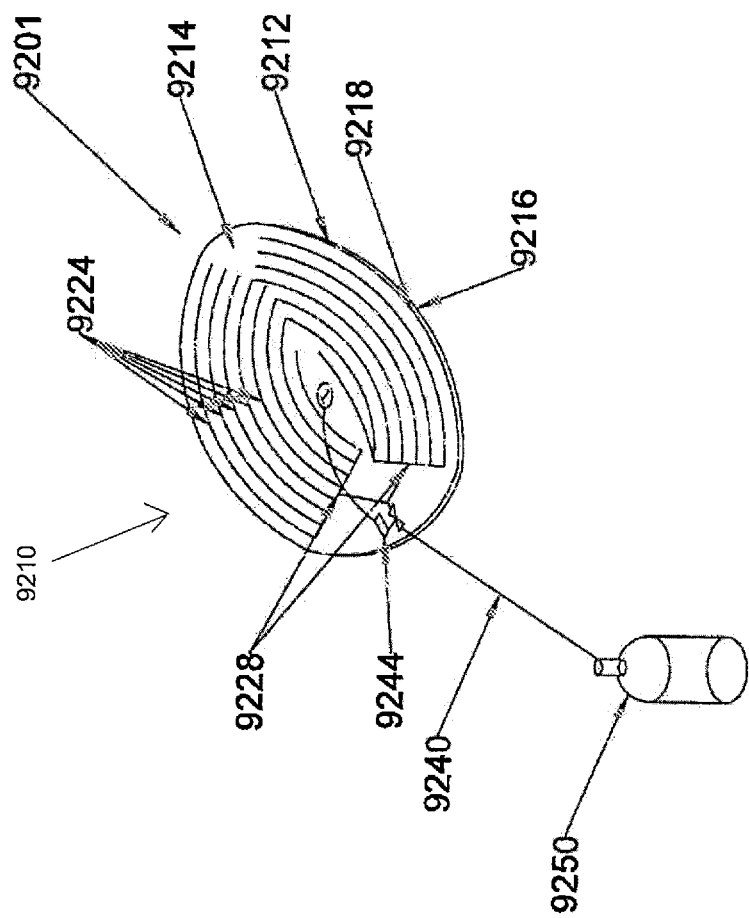
FIG. 19 is a schematic of the present invention's spot cooling system used for a body part or muscle.

Referring to FIG. 19, there is illustrated a muscle fatigue $CO_2$ cooling system 9201 to alleviate muscle fatigue/damage by direct application of a reusable self-adhesive pad 9210. Pad 9210 is generally flexible to allow improved application to a user's skin. Flexible pad 9210 has a pad top surface 9214 and a pad bottom surface 9216 that are connected by a pad vertical wall that surrounds the entire perimeter of pad 9212. The distance between pad top surface 9214 and pad bottom surface 9216 is large enough to contain tubing or capillary tubes 9224 between pad top surface 9214 and pad bottom surface 9216. Capillary tubes 9224 may be of different number and size to correspond with the desired size and thickness of pad 9210.

FIG. 19 further illustrates $CO_2$ container 9250 connected to a pad manifold 9228 which ties the tubes together by a flexible discharge line 9240. Control valve 9244 controls the amount of $CO_2$ entering capillary tubes 9224. It is within the scope of this embodiment for the control valve to be operated by a solenoid or mechanically operated as disclosed previously in this disclosure.

The flexible pad disclosed in FIG. 19 may have multiple shapes and contours to match or closely match a specific muscle group for a user. The flexible pad in FIG. 19 can spot cool a desired muscle group or area of a user's body. Other usages include, but are not limited to, a first response to heat stroke/exhaustion as well as a methodology to prevent brain damage and to reduce the fever of patients who have suffered a serious head injury/

Figure 20:
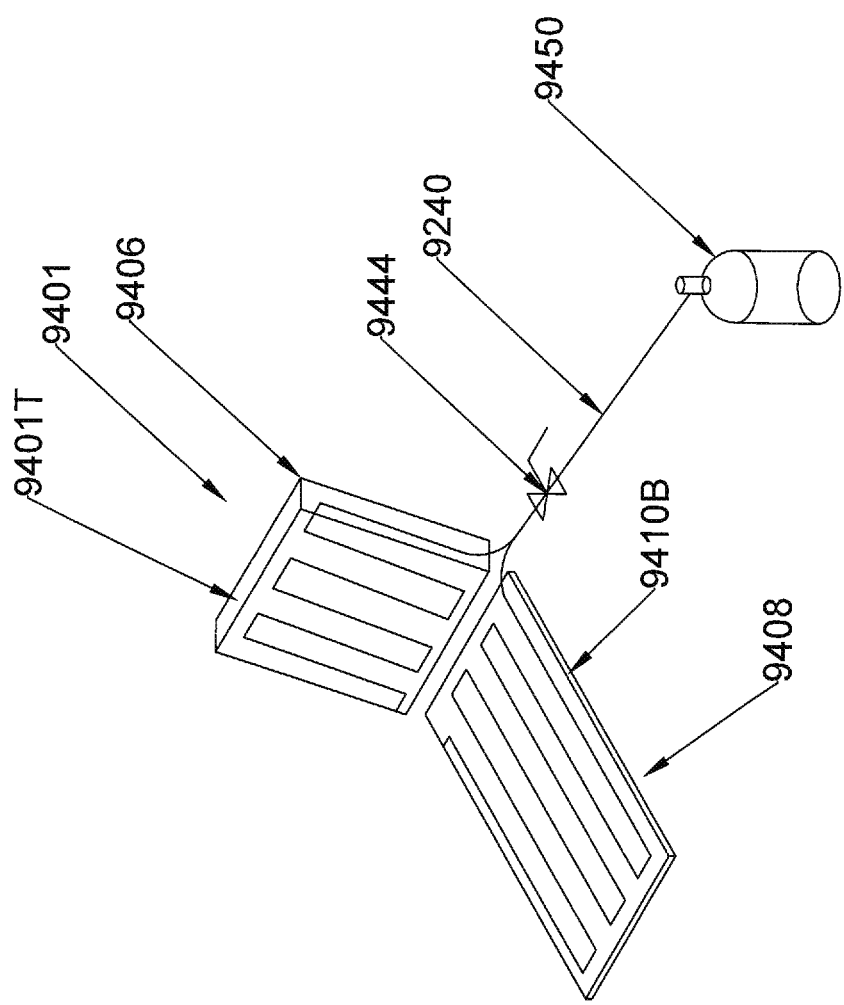
FIG. 20 is a schematic of the present invention's spot cooling system used for a chair cushion.

Referring to FIG. 20, there is illustrated a spot cooling cushion system 9401 having a top cushion 9406 and a bottom cushion 9408. Both top cushion 9406 and bottom cushion 9408 have a top surface and a bottom surface that surround and enclose capillary tubes that contain $CO_2$ that has been released from $CO_2$ container 9450 via flexible line 9240 through and controlled by control valve 9444. Similarly, both top cushion 9406 and bottom cushion 9408 each have a vertical wall (9410T and 9410B) that surround and enclose an interior area that contains capillary tubes (not illustrated). FIG. 20 discloses a $CO_2$ cooling system operated as a cooled seat system to provide cooling to the seat by means of a control valve and flexible hose. The valve can be actuated based on desired seat temperature determined by the operator.

Figure 21:
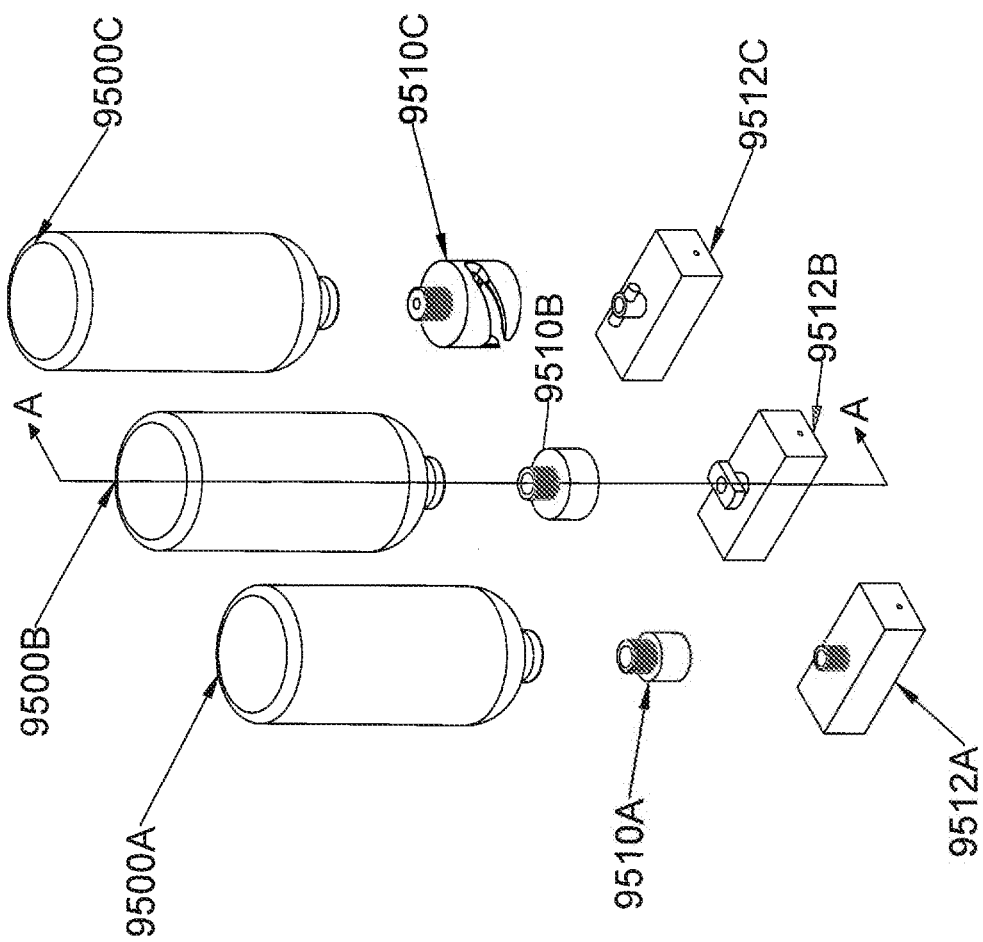
FIG. 21 is an exploded view of a three $CO_2$ canisters connecting to manifold blocks with different types of connections including a threaded connection, a wing valve connection and a helix connection.
Figure 22:
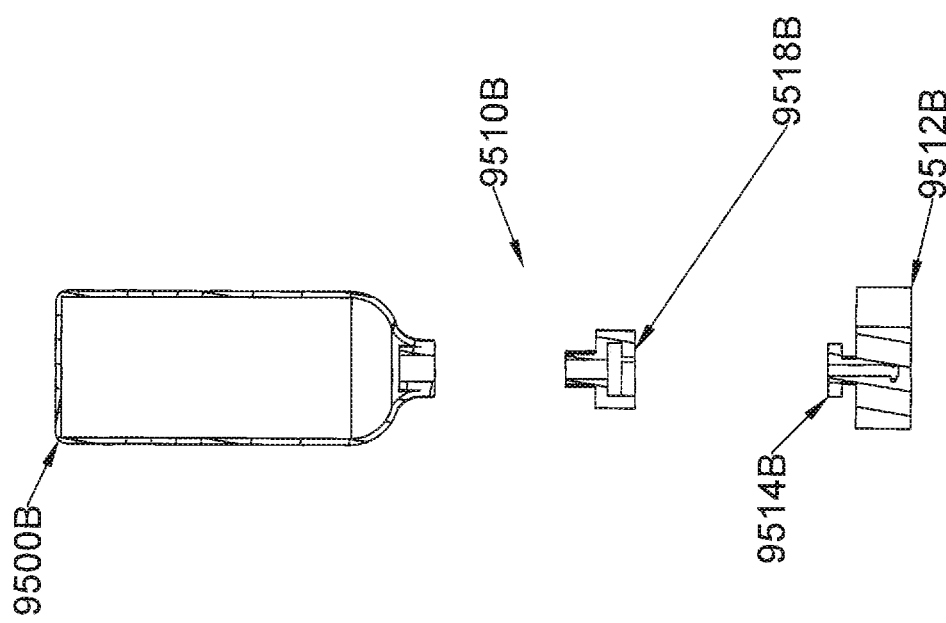
FIG. 22 is a cross-sectional view of the $CO_2$ canisters connecting to manifold blocks in FIG. 21 illustrating the wing valve connection.

Referring to FIGS. 21 and 22, there is illustrated an alternative connection means for attaching the $CO_2$ container to the manifold block. The previous description of the parts and the functioning of the $CO_2$ container and the manifold block are incorporated by reference. FIG. 21 illustrates an exploded view of three $CO_2$ containers (9500A, 9500B, and 9500C) in the upside down position above a respective valve housing (9510A, 9510B, and 9510) located above a respective manifold block (9512A, 9512B, and 9512C). $CO_2$ container 9500A is shown above a threaded valve 9510A for $CO_2$ container 9500A to connect with manifold block 9512A. $CO_2$ container 9500B is shown above $CO_2$ container valve 9510B for $CO_2$ container 9500B to connect with manifold block 9512B (and better illustrated in FIG. 22). $CO_2$ container 9500C is shown above $CO_2$ container valve 9510C for $CO_2$ container 9500C to connect with manifold block 9512C. The A series (9500A, 9510A, and 9512A) in FIG. 21 is a threaded connection between the $CO_2$ container and the manifold block. The B series (9500B, 9510B, and 9512B) in FIG. 21 is a wing valve connection between the $CO_2$ container and the manifold block. The C series (9500C, 9510C, and 9512C) in FIG. 21 is a helical connection between the $CO_2$ container and the manifold block. The helical connection creates a suction force or additional compression force when the valve closes.

Further, illustrated in FIG. 21 are wing valves 9514B and 9514C respectfully located on top of manifold blocks 9512B and 9512C. It should be appreciated that the wing valves are currently shown having the male portion extending away and upward from the manifold block, but the wing valve portion could alternatively be designed so that wing valve male portions 9514B and 9514C fit into a female cut out portion located on the tops of each of the respective manifold blocks. Similarly, it also within the spirit and scope of this invention for the wing valves to be designed as part of the canister or integrally connected to the canister.

Referring to FIG. 22, there is illustrated a cross-section of $CO_2$ container 9500B and corresponding wing valve and manifold block. FIG. 22 further shows a wing-shaped female opening 9518B located in valve housing 9510B. Female opening 9518B is designed to receive male wing valve portion 9514B. In operation, the valves will open and close based on a wing valve portion (male or female) rotating 90 degrees, also known as a quarter turn. It is also within the spirit and scope of this invention for other commonly known valves to be used to facilitate the release of $CO_2$ from the $CO_2$ container such as, but not limited to, ball valve, butterfly valve, ceramic disc valve, clapper valve, check valve or non-return valve, choke valve, diaphragm valve, gate valve, globe valve, knife valve, needle valve, pinch valve, piston valve, plug valve, poppet valve, spool valve, thermal expansion valve, pressure reducing valve, sampling valve, and safety valve. Similarly, the current function of the one or more capillary tubes can be replaced with a flow metering device or flow metering system (further discussed in FIG. 25). Also, within the spirit and scope of this invention are valves that implement the use of thermal expansion and contraction of materials to operate the opening and closing of a valve. As the temperature increases the actuation material expands opening the valve to provide cooling. As the material and the object/space is cooled to the desired temperature the actuation material contracts closes the valve. Examples of this but are not limited to paraffin wax operated mixing valves.

Figure 23:
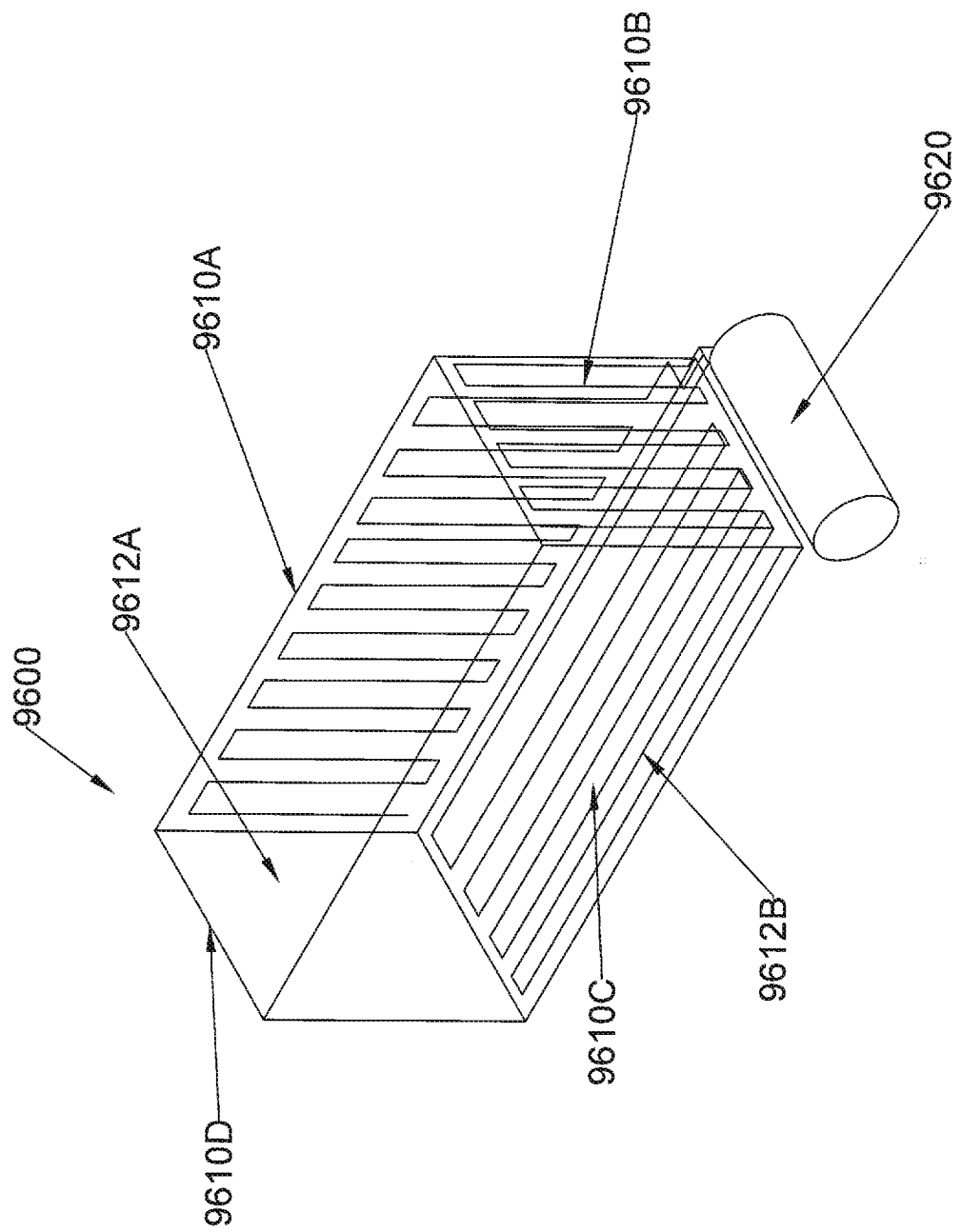
FIG. 23 is a schematic of the present invention's cooling system used inside of a truck trailer.

Referring to FIG. 23, there is illustrated a cooling system for a truck or truck trailer 9600. The connections between the $CO_2$ container 9620 and dispersion or capillary tubes (not illustrated but within the wall) are consistent with the disclosure previously illustrated. In this embodiment the capillary tubes line the vertical walls (9610A, 9610B, 9610C, and 9610D) and horizontal walls (9612A and 9612B) or a portion of either to create an enclosed cooling volume. Typically this enclosed cooling volume for this embodiment will be greater than 1 cubic foot.

Figure 24:
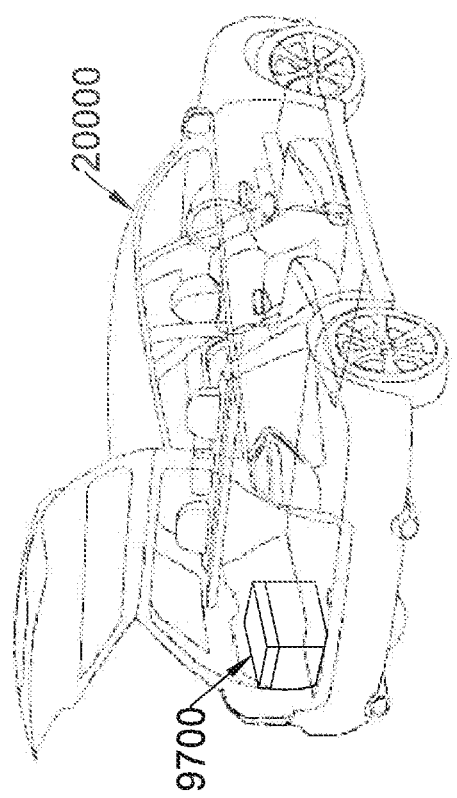
FIG. 24 is a schematic of the present invention's cooling system used inside of a vehicle.

Referring to FIG. 24, there is illustrated a vehicle 20000 that contains a box shaped cooling system 9700 in accordance with the present disclosure having a $CO_2$ container (not illustrated), a release valve (not illustrated) and capillary tubes along the walls or a portion of the walls (not illustrated). The box-shaped cooling system 9700 is not to be restricted by size, shape, or location within the vehicle, but is merely illustrated by example only. Cooling system 9700 can be of any size or shape to fit within and affixed to the vehicle or affixed to the exterior of the vehicle. It is also within the spirit and scope of this invention to include a $CO_2$ cooling system designed to provide individual cooling for individual(s) per the cooling system disclosed. Further, the $CO_2$ can be dispensed into a distribution device that can implement the venturi effect to induce the movement, mixing and cooling of ambient air with $CO_2$ providing convective cooling to operator(s). Operation can then be based on a temperature measuring device that causes the shutting down of the system. Typically the cooling volume for this embodiment will be less than one hundred (100) cubic feet.

Figure 25:
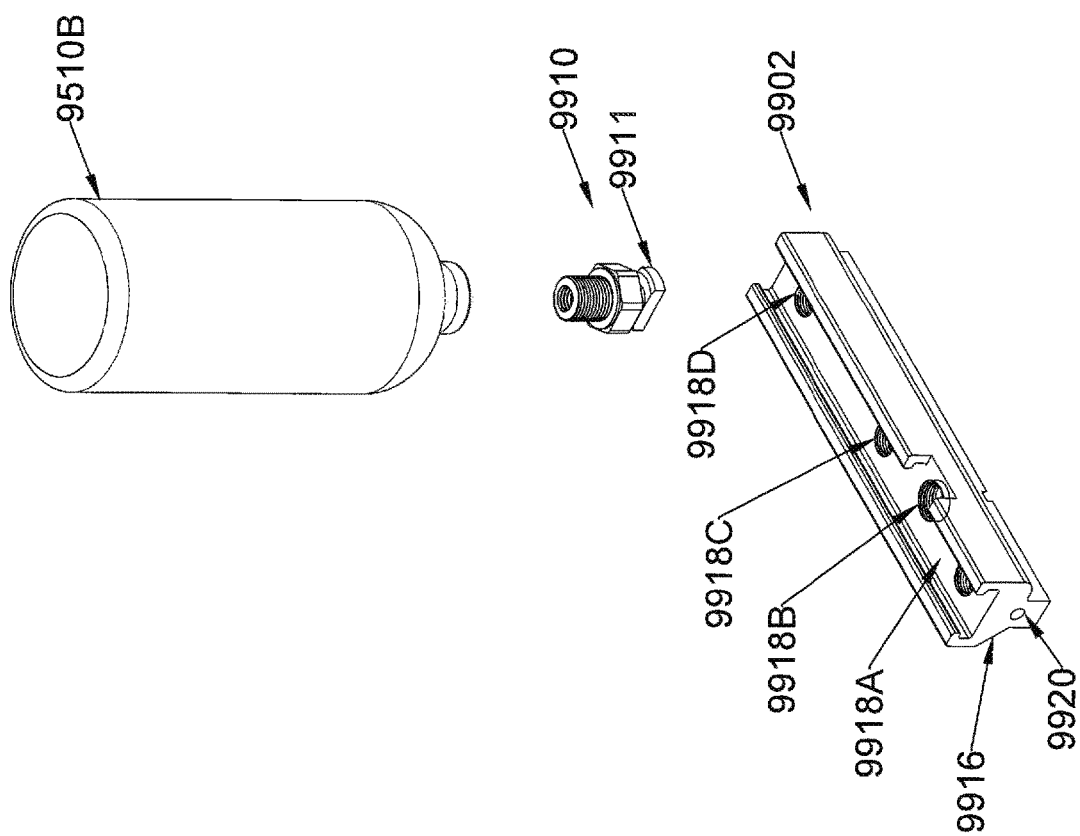
FIG. 25 is a schematic of the present invention's cooling system illustrating how the cooling system can be affixed and stabilized to the interior of a container.

Referring to FIG. 25, there is illustrated an exploded view of a $CO_2$ container 9950 above the $CO_2$ container valve 9910 with $CO_2$ container valve 9910 above a T slot 9902 that is on the upper portion of a Y shaped frame 9916. The T slot shape and Y shaped frame 9916 could be of any size or shape but illustrated here merely for example to show how the $CO_2$ containers can be affixed to the inside of a cooling system such as box shaped cooling system 9700 in FIG. 24. The Y shaped frame also has a frame connection opening 9920 to receive a rod or other similar affixing member to affix Y frame to the inside of a container such as box shaped cooling system 9700. During operation, $CO_2$ container 9950 rests above T slot 9902 and $CO_2$ container valve 9910 fits inside one of the openings (9918A, 9918B, 9918C, and 9918D) in T slot 9902 and valve handle 9911 of $CO_2$ container valve 9910 can be rotated 90 degrees (a quarter turn) to open or close the valve respectively and allow $CO_2$ to flow or to stop the flow of $CO_2$.

Figure 26:
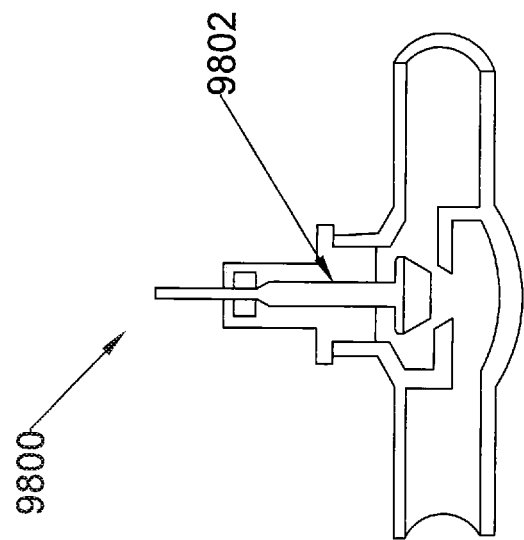
FIG. 26 is a schematic of a flow metering valve to be used in a flow metering device that maintains constant flow of fluid through a given system.

Referring to FIG. 26, there is illustrated a flow metering valve 9800 to be used in a flow metering device that maintains constant flow of fluid through a given system by means of mechanical or electromechanical principles. Devices and their principles include, but are not limited to, capillaries and orifices. Flow is limited by the creation of a pressures drop by a reduction in opening or by a length of tube. A flow meter valve is a device in which flow is varied and controlled by the position of a valve stem 9802. When actuated, the face area of the flow path is reduced or increased so that fluid media is allowed to pass. These types of valves include, but are not limited to, needle, ball or globe valves.

Figure 27:
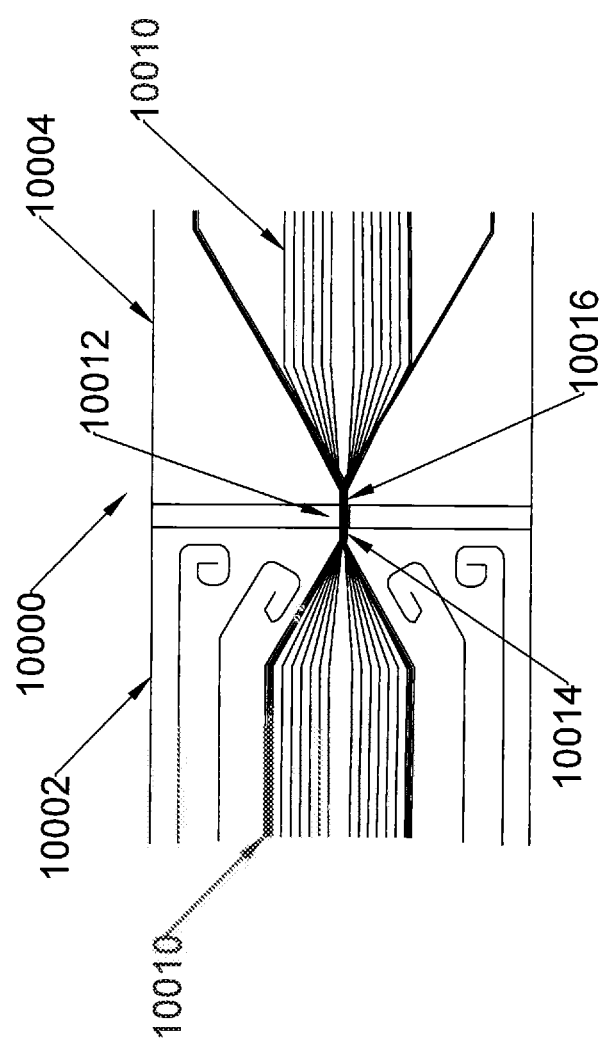
FIG. 27 is a schematic of a liquid or gas flowing through an orifice.

Referring to FIG. 27, there is illustrated a schematic of flow 10000 through an orifice or opening 10012. The schematic of flow through orifice 10012 is characterized by having a first chamber 10002 containing a fluid or gas 10010 on one side that is directed through orifice opening 10014 and orifice exit 10016 to a second chamber 10004.

Figure 28:
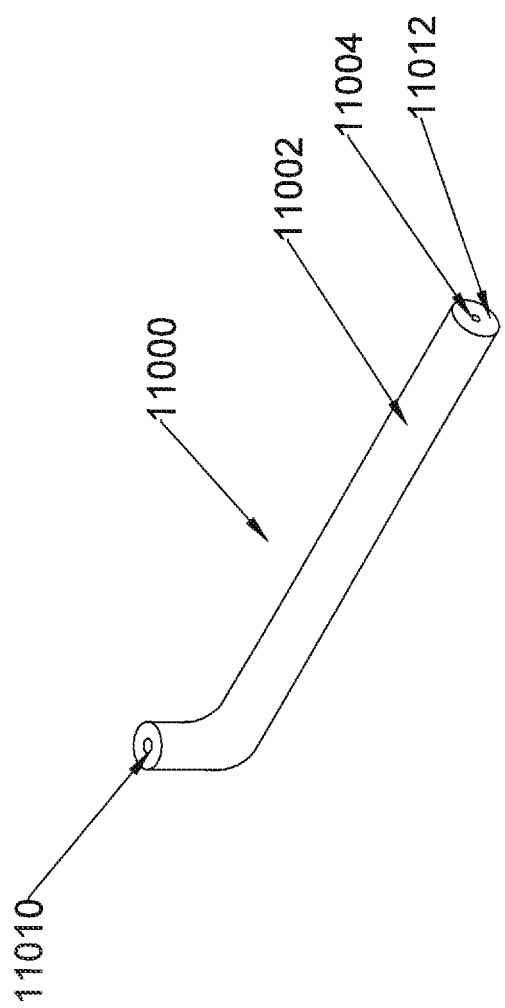
FIG. 28 is a schematic of a capillary tube utilized in the present invention.

Referring to FIG. 28, there is illustrated a capillary tube 11000 having an outer body 11002 that surrounds an opening 11004 that extends from a first end opening 11010 to a second end opening 11012. This a typical capillary tube in accordance with the present invention, however, the shape and size of the capillary tube illustrated in FIG. 28 is illustrated merely as an example. The shape and size of the capillary tube may vary based on the intended use. For example, the capillary tubes utilized in FIG. 23 for the truck trailer can be much larger than the capillary tubes utilized in the box shaped cooling system 9700 in FIG. 24.

Referring to FIG. 29, there is illustrated a hybrid cooler 12000 in which the invention's cooling system is used in combination with an electric cooler. The hybrid cooler 12000 is equipped with an electronic coordination device 12400 that coordinates when the invention's cooling system and the electronic cooler will be operated. Primarily, the electric cooler will be used to cool the contents of the container and when the power source of the electronic cooler reaches a certain level or limit, the electronic coordination device 12400 will turn off the source of power and turn on the present invention cooling system so that the contents of the container will then be cooled by the liquid or gas coolant of the present invention. It is within the spirit and scope of the present invention for both the present invention system and the electric cooler to be used simultaneously but primarily, the present invention system will be used to replace the electric cooler at the appropriate time. Hybrid Cooler 12000 has a bottom body portion 12004 that surrounds an interior chamber 12200. Hybrid cooler 12000 also has a closeable lid 12002. The functioning of the Hybrid cooler 12000 is consistent with the present disclosure which includes a liquid/gas canister 12500 that may be either right side up and/or release valve upwards or inverted. FIG. 29 illustrates liquid/gas canister 12500 with a release valve facing upwards and a connection line 12240 that connects liquid/gas canister 12500 to a flow metering system 12340 to release liquid/gas to interior chamber 12200.

As an example, a manual or automatic control switch 12850 turns on the invention's cooling system when the electrical current coming from power source 12008 which is powering the electric cooler is disrupted (e.g. utility power outage) or decreased when a vehicle engine is turned off or when determined by the operator or by the electronic device in order to optimize the energy consumption and prevent the vehicle's battery to discharge. It is also within the spirit and scope of this invention for the hybrid cooler to utilize the power source of a transportation or recreational vehicle including but not limited to: gas, fuel, diesel, electrical, hybrid, connected and automated vehicle, truck, track trailer, boat in which an algorithm automatically switches on the invention's cooling system when a pre-defined threshold of the vehicle's battery level is exceeded or when a pre-defined period of time is exceeded. Accordingly, the innovation is a cooler which has a both an electric cooling system in its walls and also has the present invention cooling system as identified in this disclosure containing gas/liquid canisters.

The present invention cooling system as defined for hybrid cooler 12000 can be turned off via a manual switch or through an electronic communication, or automatically switch on based on an algorithm.

In addition to $CO_2$, the present container includes any gas that may be compressed into a liquid at pressures up to and including 3000 psi that will undergo an expansion and phase change upon release into ambient conditions. Examples include, but are but not limited to: Propane, CO2, Methane, Butane, Nitrous Oxide, refrigerants such as R-22, 134B, 410A.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cooling system comprising:
   a. at least one $CO_2$ container retaining $CO_2$ therein;
   b. a flat plate having a flat plate top surface and a flat plate bottom surface that are connected by a flat plate vertical wall surrounding a perimeter of the flat plate;
   c. a distance between the flat plate top surface and the flat plate bottom surface large enough to retains a multiplicity of tubing routes with a multiplicity of capillary tubes, a respective one of each of the multiplicity of capillary tubes retained with a respective one of the multiplicity of tubing routes;
   d. a manifold block, said $CO_2$ container connected to said manifold block by a flexible discharge line that connects said $CO_2$ container through a manifold block hole in the manifold block;
   e. a solenoid valve positioned on the manifold block and controlling an amount of $CO_2$ entering the manifold block from the $CO_2$ container;
   f. the manifold block in fluid communication with said multiplicity of capillary tubes;
   g. each respective one of said multiplicity of capillary tubes having an outer both that surrounds an opening that extends from a first end opening of each respective one of the multiplicity of capillary tubes to a second end opening of each respective one of the multiplicity of capillary tubes; and
   h. said $CO_2$ transported to said multiplicity of capillary tubes and transmitting cooling through conduction to objects placed on the flat plate top surface.

2. The cooling system in accordance with claim 1, further comprising: each of said outer body of each respective one of said multiplicity of capillary tubes bent at an angle at a location adjacent each respective first opening for fluid connection to said manifold block.

3. The cooling system in accordance with claim 1, further comprising: said solenoid valve is an electronic solenoid valve.

4. The cooling system in accordance with claim 3, further comprising:
   a. said manifold block includes said electronic solenoid valve, a pre-load spring, a shaft, a plunger, a lever hinge pin and an actuator lever;
   b. when said electronic solenoid valve is closed, said plunger return spring holds said plunger against an orifice of said $CO_2$ container, preventing flow of $CO_2$ through said electronic solenoid valve; and
   c. when said electronic solenoid valve is energized, a magnetic field is produced, actuating said actuator lever and in turn raising said plunger and allowing $CO_2$ to flow through said electronic solenoid valve.

5. The cooling system in accordance with claim 1, further comprising: said $CO_2$ is selected from the group consisting of liquid and gas.

* * * * *